(12) United States Patent
Lerman et al.

(10) Patent No.: US 12,279,629 B1
(45) Date of Patent: Apr. 22, 2025

(54) MIXING VESSEL BAFFLES FOR A DRINK MAKER

(71) Applicant: SharkNinja Operating LLC, Needham, MA (US)

(72) Inventors: Michael Lerman, Providence, RI (US); Macrae Benziger, Dedham, MA (US); Alexander Mularski, Auburn, MA (US); Vipul Mone, Brighton, MA (US)

(73) Assignee: SharkNinja Operating LLC, Needham, MA (US)

( * ) Notice: Subject to any disclaimer, the term of this patent is extended or adjusted under 35 U.S.C. 154(b) by 0 days.

(21) Appl. No.: 18/423,899

(22) Filed: Jan. 26, 2024

Related U.S. Application Data

(63) Continuation-in-part of application No. 18/415,817, filed on Jan. 18, 2024.

(51) Int. Cl.
*A23G 9/04* (2006.01)
*A23G 9/22* (2006.01)
*B01F 27/1143* (2022.01)
*B01F 35/00* (2022.01)
*B01F 101/13* (2022.01)

(52) U.S. Cl.
CPC ............ *A23G 9/224* (2013.01); *A23G 9/045* (2013.01); *B01F 27/1143* (2022.01); *B01F 35/55* (2022.01); *B01F 2101/13* (2022.01)

(58) Field of Classification Search
CPC ..... A23G 9/224; A23G 9/045; B01F 27/1143; B01F 35/55; B01F 2101/13
See application file for complete search history.

(56) References Cited

U.S. PATENT DOCUMENTS

| | | | | |
|---|---|---|---|---|
| 531,718 A | * | 1/1895 | Stevens et al. | B01J 19/0066 366/302 |
| 718,319 A | * | 1/1903 | Cunningham | B01F 35/00 366/164.4 |
| 789,599 A | * | 5/1905 | Flatau | B02C 19/06 366/605 |
| 970,823 A | * | 9/1910 | Hopkins | B01F 27/86 366/252 |
| 975,380 A | * | 11/1910 | Berntson | B01F 35/00 366/164.4 |

(Continued)

FOREIGN PATENT DOCUMENTS

| | | |
|---|---|---|
| CN | 2681650 Y | 3/2005 |
| CN | 101035719 B | 9/2010 |

(Continued)

*Primary Examiner* — Frederick C Nicolas
(74) *Attorney, Agent, or Firm* — The Webb Law Firm

(57) ABSTRACT

A mixing vessel for a frozen drink maker is described. The mixing vessel includes a curved sidewall defining a substantially cylindrical vessel chamber therein. The vessel chamber includes a front, a rear, a right side, a left side, and a top. The mixing vessel also includes at least one internal baffle configured to control slush flow within the vessel chamber. The at least one internal baffle may be a corner baffle positioned at the front top of the vessel chamber on either the right side or the left side, a side baffle extending laterally along the vessel chamber from the front to the rear, and/or a front baffle positioned at the front of the vessel chamber extending across the top from the right side to the left side.

25 Claims, 9 Drawing Sheets

(56) References Cited

U.S. PATENT DOCUMENTS

| | | | |
|---|---|---|---|
| 1,425,814 A | 8/1922 | Valerius et al. | |
| 1,685,189 A | 9/1928 | Cover | |
| 1,818,896 A | 8/1931 | Kohr | |
| 1,896,081 A | 2/1933 | Hampson | |
| 1,953,766 A | 4/1934 | McMath et al. | |
| 2,064,861 A * | 12/1936 | Stroud | B01F 35/55 366/307 |
| 2,134,261 A | 10/1938 | Oswell et al. | |
| 2,136,224 A | 11/1938 | Weinreich | |
| 2,141,045 A | 12/1938 | Ruttiman | |
| 2,188,551 A | 1/1940 | Kaltenbach et al. | |
| 2,252,205 A * | 8/1941 | Reynolds | F16D 41/10 180/24.03 |
| 2,278,125 A * | 3/1942 | Landgraf | A47J 43/046 D7/378 |
| 2,284,155 A * | 5/1942 | Landgraf | A47J 43/046 366/205 |
| 2,316,165 A | 4/1943 | Howser | |
| 2,352,205 A * | 6/1944 | Karlson | A47J 43/07 215/382 |
| 2,352,232 A | 6/1944 | Strauss | |
| 2,411,081 A | 11/1946 | Carothers | |
| 2,541,814 A | 2/1951 | Gaddini | |
| 2,794,627 A * | 6/1957 | Rodwick | A47J 43/046 366/205 |
| 2,896,421 A | 7/1959 | Rader | |
| 2,897,862 A * | 8/1959 | Malz | A47J 43/046 366/205 |
| 2,972,239 A | 2/1961 | Vasby | |
| 3,155,053 A | 11/1964 | De Vito et al. | |
| 3,175,594 A * | 3/1965 | Jepson | A47J 43/046 366/205 |
| 3,191,398 A | 6/1965 | Rader | |
| 3,228,203 A | 1/1966 | Swenson | |
| 3,292,911 A | 12/1966 | Paul | |
| 3,300,094 A | 1/1967 | Rockola | |
| 3,319,436 A | 5/1967 | Wilch | |
| 3,400,551 A | 9/1968 | Booth et al. | |
| 3,460,716 A | 8/1969 | Thomas | |
| 3,460,717 A | 8/1969 | Thomas | |
| 3,465,540 A | 9/1969 | Carpigiani | |
| 3,580,812 A * | 5/1971 | Bender et al. | C12M 23/00 435/302.1 |
| 3,632,245 A | 1/1972 | Getman | |
| 3,939,667 A | 2/1976 | Halverson | |
| 3,988,902 A | 11/1976 | Jacobs | |
| 4,078,263 A * | 3/1978 | Campbell | B28C 5/1893 366/233 |
| 4,084,407 A | 4/1978 | Anhalt | |
| 4,157,017 A | 6/1979 | Reid | |
| 4,162,127 A | 7/1979 | Wakeman et al. | |
| 4,241,590 A | 12/1980 | Martineau | |
| 4,245,680 A | 1/1981 | Greenfield, Jr. et al. | |
| 4,275,567 A | 6/1981 | Schwitters | |
| 4,332,539 A | 6/1982 | Zani | |
| 4,394,938 A | 7/1983 | Frassanito | |
| 4,429,549 A | 2/1984 | Randolphi | |
| 4,476,146 A | 10/1984 | Manfroni | |
| 4,487,024 A | 12/1984 | Fletcher et al. | |
| 4,521,116 A * | 6/1985 | Adsit | B01F 29/401 366/54 |
| 4,528,824 A | 7/1985 | Herbert | |
| 4,637,221 A | 1/1987 | Levine | |
| 4,681,030 A | 7/1987 | Herbert | |
| 4,681,458 A | 7/1987 | Cavalli | |
| 4,698,984 A | 10/1987 | Manfroni | |
| 4,711,374 A | 12/1987 | Gaunt et al. | |
| 4,711,376 A | 12/1987 | Manfroni | |
| 4,725,008 A | 2/1988 | Rebordosa et al. | |
| 4,736,593 A | 4/1988 | Williams | |
| 4,740,088 A | 4/1988 | Kelly, Jr. | |
| 4,900,158 A * | 2/1990 | Ugolini | B01F 27/726 366/144 |
| 4,906,486 A | 3/1990 | Young | |
| 4,964,542 A | 10/1990 | Smith | |
| 5,020,698 A | 6/1991 | Crossley | |
| 5,158,506 A | 10/1992 | Kusano et al. | |
| 5,205,129 A | 4/1993 | Wright et al. | |
| 5,212,954 A | 5/1993 | Black et al. | |
| 5,363,746 A | 11/1994 | Gordon | |
| 5,389,209 A | 2/1995 | Paquette | |
| 5,419,150 A | 5/1995 | Kaiser et al. | |
| 5,463,878 A | 11/1995 | Parekh et al. | |
| 5,524,451 A | 6/1996 | Tippmann | |
| 5,603,229 A | 2/1997 | Cocchi et al. | |
| 5,644,926 A | 7/1997 | Kress | |
| 5,676,462 A * | 10/1997 | Fraczek | B01F 35/55 366/307 |
| 5,692,392 A | 12/1997 | Swier | |
| 5,706,720 A | 1/1998 | Goch et al. | |
| 5,735,602 A | 4/1998 | Salvatore | |
| 5,788,370 A | 8/1998 | Pedrazzi | |
| 5,799,726 A | 9/1998 | Frank | |
| 5,823,672 A * | 10/1998 | Barker | A47J 43/0722 366/205 |
| 5,906,105 A | 5/1999 | Ugolini | |
| 5,967,226 A | 10/1999 | Choi | |
| 6,010,035 A | 1/2000 | Estruch | |
| 6,055,900 A | 5/2000 | Bunn | |
| 6,058,721 A * | 5/2000 | Midden | A23G 9/045 62/342 |
| 6,070,417 A | 6/2000 | Benson | |
| 6,082,123 A | 7/2000 | Johnson | |
| 6,119,472 A | 9/2000 | Ross | |
| 6,176,090 B1 * | 1/2001 | Ufema | A23G 9/222 366/144 |
| 6,182,862 B1 | 2/2001 | McGill | |
| 6,220,047 B1 | 4/2001 | Vogel et al. | |
| 6,253,573 B1 | 7/2001 | Schwitters et al. | |
| 6,264,066 B1 | 7/2001 | Vincent et al. | |
| 6,301,918 B1 | 10/2001 | Quartarone et al. | |
| 6,349,852 B1 * | 2/2002 | Ford | B67D 1/0871 222/64 |
| 6,370,892 B1 | 4/2002 | Ross | |
| 6,438,987 B1 | 8/2002 | Pahl | |
| 6,490,872 B1 | 12/2002 | Beck et al. | |
| 6,513,578 B2 | 2/2003 | Frank | |
| 6,546,843 B2 | 4/2003 | Ugolini | |
| 6,553,779 B1 | 4/2003 | Boyer et al. | |
| 6,557,835 B2 * | 5/2003 | Dijk | B01F 27/86 261/87 |
| 6,619,056 B2 | 9/2003 | Midden et al. | |
| 6,622,511 B2 | 9/2003 | Ashworth et al. | |
| 6,637,214 B1 | 10/2003 | Leitzke et al. | |
| 6,679,314 B2 | 1/2004 | Frank | |
| 6,694,752 B2 | 2/2004 | Nomura et al. | |
| 6,735,967 B1 | 5/2004 | Bischel et al. | |
| 6,761,036 B2 | 7/2004 | Teague et al. | |
| 6,766,650 B2 | 7/2004 | Cunha et al. | |
| 6,772,675 B2 | 8/2004 | Ervin | |
| 6,808,305 B2 * | 10/2004 | Sharpe | B01D 37/03 366/168.1 |
| 6,817,749 B2 | 11/2004 | Saunders et al. | |
| 6,830,239 B1 | 12/2004 | Weber et al. | |
| 6,863,916 B2 | 3/2005 | Henriksen et al. | |
| 6,907,743 B2 | 6/2005 | Cocchi et al. | |
| 6,918,258 B2 | 7/2005 | Cunha et al. | |
| 6,923,010 B2 | 8/2005 | Small et al. | |
| 6,932,503 B2 | 8/2005 | Fallowes | |
| 6,948,327 B2 | 9/2005 | Bischel et al. | |
| 7,028,607 B2 | 4/2006 | Zweben | |
| 7,047,758 B2 | 5/2006 | Ross | |
| 7,100,392 B2 | 9/2006 | Cortese | |
| 7,152,765 B1 * | 12/2006 | Midden | A23G 9/22 222/511 |
| 7,165,699 B2 | 1/2007 | McGill | |
| 7,213,965 B2 | 5/2007 | Daniels, Jr. | |
| 7,264,187 B1 | 9/2007 | Kolar | |
| 7,269,960 B2 | 9/2007 | Elsom et al. | |
| 7,270,473 B2 | 9/2007 | Donthnier et al. | |
| 7,275,666 B2 | 10/2007 | Rukavina et al. | |
| 7,278,276 B2 | 10/2007 | Boyer et al. | |

(56) References Cited

U.S. PATENT DOCUMENTS

| | | | |
|---|---|---|---|
| 7,278,555 B2 | 10/2007 | McGill | |
| 7,393,690 B2* | 7/2008 | Sukavaneshvar | G01N 33/4905 |
| | | | 436/63 |
| 7,451,613 B2 | 11/2008 | Barraclough et al. | |
| 7,543,717 B2 | 6/2009 | Hinkle | |
| 7,547,135 B2* | 6/2009 | Kocienski | B01F 27/91 |
| | | | 366/273 |
| 7,587,972 B2 | 9/2009 | Katz et al. | |
| 7,603,870 B2 | 10/2009 | Mavridis et al. | |
| 7,607,821 B2* | 10/2009 | Schmidt | B01J 19/0066 |
| | | | 366/147 |
| 7,647,782 B2 | 1/2010 | Bucceri | |
| 7,648,264 B2 | 1/2010 | Breviere et al. | |
| 7,698,899 B2 | 4/2010 | Lewitus et al. | |
| 7,712,321 B2* | 5/2010 | Kadyk | A23G 9/045 |
| | | | 62/342 |
| 7,726,136 B2 | 6/2010 | Baxter et al. | |
| 7,870,749 B2 | 1/2011 | Franck et al. | |
| 7,878,702 B2* | 2/2011 | Peng | A47J 27/004 |
| | | | 366/205 |
| 7,908,871 B2 | 3/2011 | Baxter et al. | |
| 7,942,094 B2 | 5/2011 | Kounlavong et al. | |
| 8,016,168 B2 | 9/2011 | Goulet | |
| 8,123,075 B2 | 2/2012 | Kadyk | |
| 8,157,435 B2 | 4/2012 | Pryor, Jr. | |
| 8,289,514 B2* | 10/2012 | Sukavaneshvar | G01F 1/74 |
| | | | 356/337 |
| 8,297,182 B2 | 10/2012 | Cocchi et al. | |
| 8,323,015 B2 | 12/2012 | Day et al. | |
| 8,434,319 B2 | 5/2013 | Klier et al. | |
| 8,459,043 B2 | 6/2013 | Bertone | |
| 8,479,532 B2 | 7/2013 | Cocchi et al. | |
| 8,485,393 B2 | 7/2013 | Van Zeeland | |
| 8,550,695 B2* | 10/2013 | Conti | B01F 27/90 |
| | | | 366/205 |
| 8,561,839 B2* | 10/2013 | Cocchi | A23G 9/281 |
| | | | 222/146.6 |
| 8,572,998 B2 | 11/2013 | Cocchi et al. | |
| 8,584,897 B2 | 11/2013 | Belcham | |
| 8,591,097 B2 | 11/2013 | Cocchi et al. | |
| 8,616,250 B2 | 12/2013 | Herbert | |
| 8,685,477 B2 | 4/2014 | Almblad et al. | |
| 8,701,435 B2 | 4/2014 | Gist et al. | |
| 8,769,973 B2 | 7/2014 | Leaver et al. | |
| 8,770,093 B2 | 7/2014 | Cahen et al. | |
| 8,876,366 B2 | 11/2014 | Saubert | |
| 8,887,522 B2 | 11/2014 | Grampassi | |
| 8,899,063 B2 | 12/2014 | Ugolini | |
| 8,998,037 B2 | 4/2015 | Cahen et al. | |
| 9,016,077 B2 | 4/2015 | Cho et al. | |
| 9,066,529 B2 | 6/2015 | Fassberg et al. | |
| 9,089,821 B2 | 7/2015 | Seidler et al. | |
| 9,127,881 B2 | 9/2015 | Anderson et al. | |
| 9,131,709 B2 | 9/2015 | Hammonds et al. | |
| 9,198,536 B2 | 12/2015 | Lardelli et al. | |
| 9,233,829 B2 | 1/2016 | Grampassi | |
| 9,301,537 B2 | 4/2016 | Cocchi et al. | |
| 9,314,043 B2 | 4/2016 | Grampassi | |
| 9,326,529 B2 | 5/2016 | Sipp et al. | |
| 9,326,530 B2 | 5/2016 | Ugolini | |
| 9,326,531 B1 | 5/2016 | Reich et al. | |
| 9,328,948 B2 | 5/2016 | Billman et al. | |
| 9,364,114 B2 | 6/2016 | Claesson et al. | |
| 9,398,774 B2 | 7/2016 | Grampassi | |
| 9,402,408 B2 | 8/2016 | Cocchi et al. | |
| 9,420,915 B2 | 8/2016 | Dickson, Jr. et al. | |
| 9,457,386 B2 | 10/2016 | Gates et al. | |
| 9,462,826 B2 | 10/2016 | Cocchi et al. | |
| 9,528,740 B1 | 12/2016 | Gist et al. | |
| 9,565,868 B2 | 2/2017 | D'Agostino | |
| 9,591,871 B2 | 3/2017 | Ugolini | |
| 9,648,896 B2 | 5/2017 | Ugolini | |
| 9,656,227 B2 | 5/2017 | Paget | |
| 9,681,778 B2 | 6/2017 | Pendleton et al. | |
| 9,723,857 B2 | 8/2017 | Endo et al. | |
| 9,725,228 B2 | 8/2017 | Py et al. | |
| 9,763,462 B2 | 9/2017 | He et al. | |
| 9,765,891 B2 | 9/2017 | Bischel | |
| 9,833,109 B2 | 12/2017 | Farrell et al. | |
| 9,845,982 B2 | 12/2017 | Knatt | |
| 9,854,820 B2 | 1/2018 | Cocchi et al. | |
| 9,867,387 B2 | 1/2018 | Davis et al. | |
| 9,894,912 B2 | 2/2018 | Jacobsen et al. | |
| 9,895,028 B2 | 2/2018 | Gerard et al. | |
| 9,986,748 B2 | 6/2018 | Lazzarini et al. | |
| 9,993,016 B1* | 6/2018 | Dyer | A23G 9/224 |
| 10,004,250 B2 | 6/2018 | Ugolini | |
| 10,039,297 B2 | 8/2018 | Grampassi | |
| 10,039,298 B2 | 8/2018 | Noth et al. | |
| 10,094,607 B2 | 10/2018 | Broadbent | |
| 10,123,551 B2 | 11/2018 | Beth Halachmi | |
| 10,137,032 B2 | 11/2018 | Williamson et al. | |
| 10,151,523 B2 | 12/2018 | Sadot et al. | |
| 10,159,270 B2 | 12/2018 | Cocchi et al. | |
| 10,238,129 B2 | 3/2019 | Cocchi et al. | |
| 10,306,905 B2 | 6/2019 | Cocchi | |
| 10,306,906 B2 | 6/2019 | Elsom et al. | |
| 10,321,700 B2 | 6/2019 | Cocchi et al. | |
| 10,327,455 B2 | 6/2019 | Gates | |
| 10,334,868 B2 | 7/2019 | Fonte | |
| 10,357,131 B2 | 7/2019 | Dickson, Jr. et al. | |
| 10,375,973 B2 | 8/2019 | Noth et al. | |
| 10,405,562 B2 | 9/2019 | Cocchi et al. | |
| 10,463,059 B2 | 11/2019 | Bush | |
| 10,477,878 B2 | 11/2019 | Cocchi et al. | |
| 10,492,513 B1 | 12/2019 | Sullivan | |
| 10,548,336 B2 | 2/2020 | Tuchrelo et al. | |
| 10,555,545 B2 | 2/2020 | Bischel | |
| 10,570,897 B2 | 2/2020 | Cocchi et al. | |
| 10,571,041 B2 | 2/2020 | Bischel | |
| 10,588,330 B2 | 3/2020 | Cocchi et al. | |
| 10,624,364 B2 | 4/2020 | Cocchi et al. | |
| 10,638,774 B2 | 5/2020 | Grampassi | |
| 10,645,947 B2 | 5/2020 | Versteeg et al. | |
| 10,660,348 B2 | 5/2020 | Cheung | |
| 10,660,349 B2 | 5/2020 | Cocchi et al. | |
| 10,674,743 B2 | 6/2020 | Ugolini | |
| 10,674,744 B2 | 6/2020 | Cocchi et al. | |
| 10,712,063 B2 | 7/2020 | Cobabe et al. | |
| 10,712,087 B2 | 7/2020 | Cui et al. | |
| 10,712,094 B2 | 7/2020 | Cocchi et al. | |
| 10,721,944 B2* | 7/2020 | Dong | B01F 27/63 |
| 10,736,336 B2 | 8/2020 | Cocchi et al. | |
| 10,736,337 B2 | 8/2020 | Seiler et al. | |
| 10,743,563 B2 | 8/2020 | Mohammed et al. | |
| 10,788,246 B2 | 9/2020 | Frank et al. | |
| 10,806,163 B2 | 10/2020 | Dong et al. | |
| 10,856,697 B2* | 12/2020 | Boozer | B01F 35/5312 |
| 10,865,459 B2* | 12/2020 | Latva-Kokko | B01F 23/2311 |
| 10,894,705 B2 | 1/2021 | Cocchi et al. | |
| 10,952,455 B2 | 3/2021 | Cocchi et al. | |
| 10,952,456 B2 | 3/2021 | Cocchi et al. | |
| 11,027,300 B2 | 6/2021 | Crossdale et al. | |
| 11,051,531 B2 | 7/2021 | Cocchi et al. | |
| 11,064,715 B2 | 7/2021 | Herbert et al. | |
| 11,118,841 B2 | 9/2021 | Minard | |
| 11,122,816 B2 | 9/2021 | Yang et al. | |
| 11,134,703 B2 | 10/2021 | Cocchi et al. | |
| 11,140,911 B2 | 10/2021 | Cocchi et al. | |
| 11,147,289 B2 | 10/2021 | San Miguel et al. | |
| 11,154,074 B2 | 10/2021 | Greenberg et al. | |
| 11,154,163 B1 | 10/2021 | He et al. | |
| 11,185,091 B2 | 11/2021 | Koehl et al. | |
| 11,187,443 B2 | 11/2021 | Cocchi et al. | |
| 11,213,046 B2 | 1/2022 | Cocchi et al. | |
| 11,278,040 B2 | 3/2022 | Newton et al. | |
| 11,291,218 B2 | 4/2022 | Soffientini et al. | |
| 11,337,549 B2 | 5/2022 | Tuchrelo et al. | |
| 11,344,045 B2 | 5/2022 | Tuchrelo et al. | |
| 11,399,552 B2 | 8/2022 | Cocchi et al. | |
| 11,406,119 B2 | 8/2022 | Cocchi et al. | |
| 11,412,757 B2 | 8/2022 | Velez et al. | |
| 11,412,884 B2 | 8/2022 | Herbert et al. | |

(56) References Cited

U.S. PATENT DOCUMENTS

| | | |
|---|---|---|
| 11,470,855 B2 | 10/2022 | Fonte et al. |
| 11,484,042 B2 | 11/2022 | Cocchi et al. |
| 11,490,635 B2 | 11/2022 | Dong |
| 11,497,228 B2 | 11/2022 | Wadle et al. |
| 11,503,841 B2 | 11/2022 | Fonte et al. |
| 11,510,421 B2 | 11/2022 | Mfrach |
| 11,519,650 B2 | 12/2022 | Rupp |
| 11,528,922 B2 | 12/2022 | Beth Halachmi |
| RE49,350 E | 1/2023 | Barniol Gutierrez et al. |
| 11,540,533 B2 | 1/2023 | Cocchi et al. |
| 11,571,006 B2 | 2/2023 | Luca et al. |
| 11,576,398 B2 | 2/2023 | Tassi et al. |
| 11,582,985 B2 | 2/2023 | Cocchi et al. |
| 11,590,466 B2 | 2/2023 | Charopoulos et al. |
| 11,627,747 B2 | 4/2023 | Fonte et al. |
| 11,634,312 B2 | 4/2023 | Fonte et al. |
| 11,643,321 B2 | 5/2023 | Bush et al. |
| 11,696,589 B2 | 7/2023 | Cocchi et al. |
| 11,751,582 B2 | 9/2023 | Lazzarini et al. |
| 11,758,920 B1 | 9/2023 | Frank et al. |
| 11,771,108 B2 | 10/2023 | Lazzarini et al. |
| 11,805,789 B2 | 11/2023 | Springer et al. |
| 2001/0052239 A1 | 12/2001 | Dorner |
| 2002/0162339 A1 | 11/2002 | Harrison et al. |
| 2003/0000240 A1 | 1/2003 | Pahl |
| 2003/0080644 A1 | 5/2003 | Nelson et al. |
| 2003/0192325 A1 | 10/2003 | Cocchi et al. |
| 2003/0227817 A1* | 12/2003 | Martel ............... B01F 33/81 366/157.4 |
| 2004/0187514 A1 | 9/2004 | Franck et al. |
| 2004/0226305 A1 | 11/2004 | Grampassi |
| 2006/0043088 A1 | 3/2006 | Ancona et al. |
| 2006/0044935 A1 | 3/2006 | Benelli et al. |
| 2006/0156754 A1 | 7/2006 | Liu |
| 2006/0169147 A1 | 8/2006 | Cocchi et al. |
| 2006/0169727 A1 | 8/2006 | Cocchi et al. |
| 2006/0213903 A1 | 9/2006 | Lin |
| 2007/0119867 A1 | 5/2007 | Nakato et al. |
| 2007/0151101 A1 | 7/2007 | Cocchi et al. |
| 2008/0073376 A1 | 3/2008 | Gist et al. |
| 2008/0098765 A1* | 5/2008 | Bond ............... A23G 9/045 62/353 |
| 2008/0149655 A1 | 6/2008 | Gist et al. |
| 2008/0202130 A1 | 8/2008 | Kadyk |
| 2008/0282722 A1 | 11/2008 | Edmonds et al. |
| 2009/0127295 A1 | 5/2009 | Cocchi et al. |
| 2010/0050655 A1 | 3/2010 | Bravo et al. |
| 2010/0116846 A1 | 5/2010 | Cortese et al. |
| 2010/0147875 A1 | 6/2010 | Santos et al. |
| 2010/0293965 A1 | 11/2010 | Frank et al. |
| 2011/0101039 A1 | 5/2011 | Cocchi et al. |
| 2011/0262600 A1 | 10/2011 | McGill |
| 2012/0096876 A1 | 4/2012 | Ravji et al. |
| 2012/0223094 A1 | 9/2012 | Rickard, Jr. et al. |
| 2012/0298690 A1 | 11/2012 | Skobel et al. |
| 2012/0312049 A1 | 12/2012 | Downs, III et al. |
| 2013/0077433 A1* | 3/2013 | Conti ............... A47J 43/0727 366/205 |
| 2013/0098098 A1* | 4/2013 | Ugolini ............... A23G 9/281 62/342 |
| 2013/0263747 A1 | 10/2013 | Ugolini |
| 2014/0043931 A1* | 2/2014 | Figueroa ............ B01F 35/5312 366/130 |
| 2014/0209635 A1 | 7/2014 | Gates et al. |
| 2014/0212566 A1 | 7/2014 | Herbert et al. |
| 2014/0263415 A1 | 9/2014 | San Miguel et al. |
| 2015/0191685 A1 | 7/2015 | Kyle |
| 2015/0245636 A1 | 9/2015 | Forrester, Jr. |
| 2015/0264959 A1 | 9/2015 | Colwell et al. |
| 2016/0015217 A1* | 1/2016 | Rojas Restrepo .... A47J 43/046 366/314 |
| 2016/0262422 A1 | 9/2016 | Biglari et al. |
| 2016/0353766 A1* | 12/2016 | Jacobsen ............... A23G 9/12 |
| 2017/0027188 A1 | 2/2017 | Raybin et al. |
| 2017/0332658 A1 | 11/2017 | Mitchell et al. |
| 2017/0367370 A1 | 12/2017 | Frisque et al. |
| 2018/0014553 A1* | 1/2018 | Ugolini ............... A23G 9/288 |
| 2018/0184682 A1 | 7/2018 | Bertone |
| 2018/0206519 A1 | 7/2018 | Noth et al. |
| 2018/0228180 A1* | 8/2018 | Cocchi ............... A23G 9/12 |
| 2018/0231318 A1* | 8/2018 | Cocchi ............... F28D 1/0213 |
| 2019/0056182 A1 | 2/2019 | Bischel et al. |
| 2019/0070643 A1 | 3/2019 | Wong et al. |
| 2019/0110496 A1 | 4/2019 | Cocchi et al. |
| 2019/0124944 A1* | 5/2019 | Caiano ............... A23G 9/20 |
| 2019/0125122 A1 | 5/2019 | Feola |
| 2019/0166873 A1 | 6/2019 | Grampassi |
| 2019/0313664 A1 | 10/2019 | Haas et al. |
| 2020/0107559 A1 | 4/2020 | Deshpande et al. |
| 2020/0173697 A1 | 6/2020 | Resnick |
| 2020/0288747 A1 | 9/2020 | Greenberg et al. |
| 2020/0339407 A1 | 10/2020 | Caiano |
| 2021/0000133 A1 | 1/2021 | Meldrum et al. |
| 2021/0003549 A1 | 1/2021 | Ino et al. |
| 2021/0022364 A1 | 1/2021 | Meldrum et al. |
| 2021/0084930 A1 | 3/2021 | Fonte |
| 2021/0085129 A1* | 3/2021 | Boozer ............... A47J 43/0722 |
| 2021/0152649 A1 | 5/2021 | Ciepiel |
| 2021/0161182 A1 | 6/2021 | Stoenescu et al. |
| 2021/0360979 A1 | 11/2021 | Leb et al. |
| 2021/0368821 A1 | 12/2021 | Tassi et al. |
| 2021/0371265 A1* | 12/2021 | Fonte ............... B67D 1/0859 |
| 2022/0030906 A1 | 2/2022 | Springer et al. |
| 2022/0073336 A1 | 3/2022 | Savioz |
| 2022/0087284 A1 | 3/2022 | Savioz |
| 2022/0110339 A1 | 4/2022 | Beth Halachmi et al. |
| 2022/0117255 A1 | 4/2022 | Lazzarini et al. |
| 2022/0117256 A1 | 4/2022 | Wang |
| 2022/0174978 A1 | 6/2022 | Douer |
| 2022/0211072 A1 | 7/2022 | Tran et al. |
| 2022/0225636 A1 | 7/2022 | Minard et al. |
| 2022/0240533 A1 | 8/2022 | Dees et al. |
| 2022/0273141 A1 | 9/2022 | Atinaja |
| 2022/0295822 A1 | 9/2022 | Lazzarini et al. |
| 2022/0394996 A1 | 12/2022 | Lazzarini et al. |
| 2023/0000289 A1 | 1/2023 | Kolar et al. |
| 2023/0038281 A1 | 2/2023 | Gee, II et al. |
| 2023/0040750 A1 | 2/2023 | Ciepiel et al. |
| 2023/0055322 A1 | 2/2023 | Griffiths et al. |
| 2023/0074503 A1 | 3/2023 | Kanellos et al. |
| 2023/0107530 A1 | 4/2023 | Kadyk et al. |
| 2023/0180785 A1 | 6/2023 | Feola |
| 2023/0292785 A1 | 9/2023 | Collins et al. |
| 2023/0413851 A1 | 12/2023 | Resnick et al. |
| 2024/0074453 A1* | 3/2024 | Herbert ............... A23G 9/12 |
| 2024/0292979 A1* | 9/2024 | Weinstock ............... A23G 9/12 |
| 2024/0292980 A1* | 9/2024 | Weinstock ............... A23G 9/224 |

FOREIGN PATENT DOCUMENTS

| | | |
|---|---|---|
| CN | 101897379 A | 12/2010 |
| CN | 102395280 A | 3/2012 |
| CN | 1981590 B | 7/2012 |
| CN | 101073373 B | 9/2012 |
| CN | 102869269 A | 1/2013 |
| CN | 101433257 B | 3/2013 |
| CN | 202773994 U | 3/2013 |
| CN | 101263838 B | 6/2013 |
| CN | 101842022 B | 5/2014 |
| CN | 102802432 B | 9/2014 |
| CN | 104222447 A | 12/2014 |
| CN | 102791142 B | 2/2015 |
| CN | 103052324 B | 2/2015 |
| CN | 104351455 A | 2/2015 |
| CN | 104839419 A | 8/2015 |
| CN | 103727718 B | 5/2016 |
| CN | 104146140 B | 6/2016 |
| CN | 105685363 A | 6/2016 |
| CN | 105767441 A | 7/2016 |
| CN | 105876067 A | 8/2016 |
| CN | 104349681 B | 12/2016 |
| CN | 106472801 A | 3/2017 |
| CN | 106472802 A | 3/2017 |

(56) References Cited

FOREIGN PATENT DOCUMENTS

| | | |
|---|---|---|
| CN | 103619187 B | 5/2017 |
| CN | 103796562 B | 5/2017 |
| CN | 106720895 A | 5/2017 |
| CN | 106720899 A | 5/2017 |
| CN | 103190521 B | 6/2017 |
| CN | 106900971 A | 6/2017 |
| CN | 106998739 A | 8/2017 |
| CN | 105636681 B | 2/2018 |
| CN | 105928284 B | 3/2018 |
| CN | 108471774 A | 8/2018 |
| CN | 108967640 A | 12/2018 |
| CN | 109068679 A | 12/2018 |
| CN | 109152386 A | 1/2019 |
| CN | 109497252 A | 3/2019 |
| CN | 106414244 B | 8/2019 |
| CN | 110168296 A | 8/2019 |
| CN | 105142417 B | 10/2019 |
| CN | 105517448 B | 11/2019 |
| CN | 110432373 A | 11/2019 |
| CN | 110477182 A | 11/2019 |
| CN | 104782875 B | 12/2019 |
| CN | 105992518 B | 12/2019 |
| CN | 110573023 A | 12/2019 |
| CN | 110604206 A | 12/2019 |
| CN | 104543313 B | 3/2020 |
| CN | 111011572 A | 4/2020 |
| CN | 111096388 A | 5/2020 |
| CN | 111386045 A | 7/2020 |
| CN | 111887338 A | 11/2020 |
| CN | 111903828 A | 11/2020 |
| CN | 111918557 A | 11/2020 |
| CN | 111918558 A | 11/2020 |
| CN | 112262910 A | 1/2021 |
| CN | 105767440 B | 3/2021 |
| CN | 105795089 B | 3/2021 |
| CN | 111609640 B | 5/2021 |
| CN | 106562677 B | 6/2021 |
| CN | 112911941 A | 6/2021 |
| CN | 105028886 B | 7/2021 |
| CN | 105580972 B | 7/2021 |
| CN | 109689530 B | 9/2021 |
| CN | 214223471 U | 9/2021 |
| CN | 106234750 B | 10/2021 |
| CN | 107279447 B | 10/2021 |
| CN | 113483505 A | 10/2021 |
| CN | 214316889 U | 10/2021 |
| CN | 113729494 A | 12/2021 |
| CN | 113776237 A | 12/2021 |
| CN | 215176200 U | 12/2021 |
| CN | 113892544 A | 1/2022 |
| CN | 113892551 A | 1/2022 |
| CN | 113907172 A | 1/2022 |
| CN | 113925109 A | 1/2022 |
| CN | 216088684 U | 3/2022 |
| CN | 108471775 B | 5/2022 |
| CN | 114424796 A | 5/2022 |
| CN | 114760847 A | 7/2022 |
| CN | 114760848 A | 7/2022 |
| CN | 216906702 U | 7/2022 |
| CN | 114868828 A | 8/2022 |
| CN | 114870688 A | 8/2022 |
| CN | 115348822 A | 11/2022 |
| CN | 115397250 A | 11/2022 |
| CN | 108402274 B | 12/2022 |
| CN | 218495421 U | 2/2023 |
| CN | 109414034 B | 3/2023 |
| CN | 109463523 B | 3/2023 |
| CN | 107788200 B | 6/2023 |
| CN | 109090329 B | 6/2023 |
| CN | 110269127 B | 7/2023 |
| CN | 116473154 A | 7/2023 |
| CN | 113892548 B | 8/2023 |
| CN | 113925107 B | 8/2023 |
| CN | 113892544 B | 9/2023 |
| CN | 113728208 B | 10/2023 |
| CN | 114009573 B | 10/2023 |
| CN | 114009574 B | 10/2023 |
| CN | 220287817 U | 1/2024 |
| CN | 308416570 S | 1/2024 |
| CN | 308422196 S | 1/2024 |
| CN | 117928143 A | 4/2024 |
| CN | 117958344 A | 5/2024 |
| CN | 221059481 U | 6/2024 |
| CN | 308671658 S | 6/2024 |
| CN | 118383446 A | 7/2024 |
| CN | 118383447 A | 7/2024 |
| CN | 118383448 A | 7/2024 |
| CN | 308729489 S | 7/2024 |
| CN | 118415268 A | 8/2024 |
| CN | 118442732 A | 8/2024 |
| CN | 118463436 A | 8/2024 |
| CN | 118489792 A | 8/2024 |
| CN | 118645963 A | 9/2024 |
| CN | 221881850 U | 10/2024 |
| CN | 118873002 A | 11/2024 |
| CN | 118912748 A | 11/2024 |
| CN | 118949740 A | 11/2024 |
| CN | 119097039 A | 12/2024 |
| CN | 119111683 A | 12/2024 |
| CN | 222278939 U | 12/2024 |
| CN | 119344398 A | 1/2025 |
| DE | 1981857 U | 3/1968 |
| DE | 2225460 | 12/1973 |
| DE | 102016219197 A1 | 4/2018 |
| EP | 0022090 B1 | 9/1984 |
| EP | 0133844 A1 | 3/1985 |
| EP | 0250245 B1 | 3/1991 |
| EP | 0793535 B1 | 6/1999 |
| EP | 0861597 A3 | 11/1999 |
| EP | 0827480 B1 | 9/2002 |
| EP | 0876765 B1 | 10/2002 |
| EP | 0910269 B1 | 10/2002 |
| EP | 1132007 A3 | 9/2003 |
| EP | 0893070 B1 | 9/2005 |
| EP | 1808622 A1 | 7/2007 |
| EP | 1635682 B1 | 8/2007 |
| EP | 1787524 A3 | 11/2008 |
| EP | 1738652 B1 | 5/2009 |
| EP | 2266416 A1 | 12/2010 |
| EP | 2332450 A1 | 6/2011 |
| EP | 1980156 B1 | 6/2012 |
| EP | 2062481 B1 | 6/2012 |
| EP | 2342997 B1 | 6/2012 |
| EP | 2478774 A1 | 7/2012 |
| EP | 2064957 B1 | 1/2013 |
| EP | 2446750 B1 | 1/2013 |
| EP | 2578119 A1 | 4/2013 |
| EP | 2267340 B1 | 3/2014 |
| EP | 2613643 B1 | 4/2014 |
| EP | 2508080 B1 | 5/2015 |
| EP | 2708169 B1 | 6/2015 |
| EP | 2680708 B1 | 1/2016 |
| EP | 2550869 B1 | 2/2017 |
| EP | 2805620 B1 | 2/2017 |
| EP | 2269469 B1 | 4/2017 |
| EP | 2277386 B1 | 4/2017 |
| EP | 2713765 B1 | 8/2017 |
| EP | 2653808 A3 | 1/2018 |
| EP | 2863777 B1 | 6/2018 |
| EP | 3348516 A1 | 7/2018 |
| EP | 3360422 A1 | 8/2018 |
| EP | 3172970 B1 | 1/2019 |
| EP | 3399865 B1 | 7/2019 |
| EP | 3324804 B1 | 3/2020 |
| EP | 3245430 B1 | 5/2020 |
| EP | 3669661 A1 | 6/2020 |
| EP | 3351113 B1 | 12/2020 |
| EP | 3340844 B1 | 10/2022 |
| EP | 3473950 B1 | 3/2023 |
| EP | 3519347 B1 | 3/2023 |
| EP | 3554252 B1 | 5/2023 |
| EP | 3793416 B1 | 5/2023 |
| EP | 3616528 B1 | 7/2023 |
| FR | 2574253 B1 | 2/1990 |

(56) References Cited

FOREIGN PATENT DOCUMENTS

| | | |
|---|---:|---|
| FR | 2705550 A1 | 12/1994 |
| GB | 1183551 | 3/1970 |
| GB | 2444979 B | 6/2008 |
| IT | BO20100713 A1 | 5/2012 |
| IT | 201900002923 A1 | 8/2020 |
| JP | H11113498 A | 4/1999 |
| JP | 2001169730 A | 6/2001 |
| KR | 100214695 B1 | 8/1999 |
| WO | 0125673 A1 | 4/2001 |
| WO | 0197628 A1 | 12/2001 |
| WO | 2004054380 A1 | 7/2004 |
| WO | 2008001520 A1 | 1/2008 |
| WO | 2008119980 A1 | 10/2008 |
| WO | 2011081301 A2 | 7/2011 |
| WO | 2016069106 A1 | 5/2016 |
| WO | 2019057130 A1 | 3/2019 |
| WO | 2020191221 A1 | 9/2020 |
| WO | 2021250682 A1 | 12/2021 |
| WO | 2022205902 A1 | 10/2022 |
| WO | 2023042084 A1 | 3/2023 |
| WO | 2023091416 A3 | 5/2023 |
| WO | 2023131944 A1 | 7/2023 |

\* cited by examiner

MIXING VESSEL BAFFLES FOR A DRINK MAKER

REFERENCE TO RELATED APPLICATIONS

This application is a continuation-in-part of U.S. patent application Ser. No. 18/415,817, filed on Jan. 18, 2024, the entire contents of which are incorporated herein by reference.

TECHNICAL FIELD

The present disclosure relates to a drink maker and, more particularly, to a frozen drink maker including a mixing vessel with at least one internal baffle to control slush flow within the mixing vessel during processing.

BACKGROUND

Frozen drink makers, which may also be referred to as semi-frozen beverage makers, or crushed-ice drink makers, typically include a transparent tank or mixing vessel in which a drink product is received and processed, including being cooled, often transforming the drink product from a pure liquid (or a combination of a liquid and portions of ice) to a frozen or semi-frozen product, such as, for example, a granita, slush drink, smoothie, ice cream, or other frozen or semi-frozen product, which is then dispensed. The cooled product is typically dispensed through a tap, spigot or dispenser located at the front and near the bottom of the vessel. Thus, the term "frozen drink maker" as used herein is not limited to a device that only makes drinks or frozen drinks, but includes devices that cool received drink products to produce cooled outputs in any of a variety of frozen and semi-frozen forms. A drink product typically consists of a mixture of water or milk, a syrup, flavoring powders, or other additives that give the drink product the desired taste and color.

Some existing frozen drink makers include a mixing system within the mixing vessel having a mixing blade or auger that is rotated by a motor via a drive shaft and drive assembly. Some existing frozen drink makers include a refrigeration system having a compressor, a condenser and an evaporator (i.e., chiller) for receiving refrigerant from the compressor where the evaporator is located adjacent to or within the mixing vessel to cool the drink product during processing.

Some existing frozen drink makers include a controller that controls operations of the frozen drink maker related to making drink products, including the temperature of frozen food products during processing.

SUMMARY

The application, in various implementations, addresses deficiencies associated with controlling slush flow within a mixing vessel of a frozen drink maker. This application describes illustrative systems, methods, and devices that use one or more internal baffles positioned within the mixing vessel to direct slush flow for thorough mixing and to prevent blockage within the mixing vessel. The one or more internal baffles control flow of contents within the mixing vessel can also reduce waste (e.g., waste caused by slush sticking to the vessel instead of dispensing through the spout).

In a first aspect, a mixing vessel for a frozen drink maker is described and the mixing vessel has at least one internal baffle. The mixing vessel includes a curved sidewall defining a substantially cylindrical vessel chamber therein. The vessel chamber includes a front, a rear, a right side, a left side, and a top. The mixing vessel also includes a corner baffle configured to control slush flow within the vessel chamber. The corner baffle is positioned at the front top of the vessel chamber on either the right side or the left side.

The mixing vessel may be configured to accommodate a dasher that rotates within the vessel chamber about a center axis and the corner baffle may be positioned such that the dasher is directed toward the corner baffle while moving upwardly within the vessel chamber. In these and other implementations, the corner baffle is positioned on the left side of the vessel chamber and the dasher is arranged to rotate in a clockwise direction. In select implementations, a distance from the center axis of the dasher to the top of the vessel chamber is less than 16 inches.

The corner baffle may extend out from the front into the vessel chamber at a relatively constant distance. In some implementations, the mixing vessel also includes a side baffle extending laterally along the vessel chamber from the front to the rear. The side baffle may include a curved surface that protrudes inwardly relative to a cross-section of the vessel chamber when viewed along a center axis of the vessel chamber. In these and other implementations, the side baffle is positioned on the left side or the right side of the vessel chamber. The side baffle and the corner baffle may both be positioned on either the left side or the right side of the vessel chamber. In some implementations, the mixing vessel also includes a front baffle positioned at the front of the vessel chamber extending across the top. In these and other implementations, the front baffle forms an angle of between 100°-150° relative the front of the vessel chamber. In various implementations in which the front baffle is present, the mixing vessel also includes a side baffle extending laterally along the vessel chamber from the front to the rear, and the corner baffle has a curved surface that extends from the side baffle to the front baffle. The substantially cylindrical vessel chamber may have an at least partially oval-shaped cross-section.

In another aspect, a mixing vessel for a frozen drink maker is described and the mixing vessel has at least three internal baffles. The mixing vessel includes a curved sidewall defining a substantially cylindrical vessel chamber therein. The vessel chamber includes a front, a rear, a right side, a left side, and a top. The mixing vessel includes a corner baffle positioned at the front top of the vessel chamber on either the right side or the left side. The mixing vessel also includes a side baffle extending laterally along the vessel chamber from the front to the rear. The mixing vessel further includes a front baffle positioned at the front of the vessel chamber extending across the top.

In some implementations, the side baffle and the corner baffle are both positioned on either the left side or the right side of the vessel chamber. In these and other implementations, the mixing vessel is configured to accommodate a dasher that rotates within the vessel chamber about a center axis. The corner baffle and the side baffle are positioned such that the dasher is directed toward the corner baffle and the side baffle while moving upwardly within the vessel chamber. In these and other implementations, the corner baffle and the side baffle are positioned on the left side of the vessel chamber and the dasher is arranged to rotate in a clockwise direction. In select implementations, a distance from the center axis of the dasher to the top of the vessel chamber is less than 16 inches. The corner baffle may extend out from the front into the vessel chamber at a relatively constant distance.

In yet another aspect, a frozen drink maker is described. The frozen drink maker includes a mixing vessel, a housing, a dasher, and a disperser assembly. The mixing vessel has a front, a rear, and a curved sidewall defining a vessel chamber therein. The housing has an upper housing section abutting the rear of the mixing vessel. The dasher is arranged to rotate within the mixing vessel about a center axis. The disperser assembly is at the front of the mixing vessel. The mixing vessel includes at least two internal baffles configured to control slush flow within the vessel chamber.

In some implementations, the mixing vessel includes at least three internal baffles configured to control slush flow within the vessel chamber. In some such implementations, the at least three internal baffles include: (1) a corner baffle positioned at a front top of the vessel chamber on either a right side or a left side, (2) a side baffle extending laterally along the vessel chamber from the front to the rear, and (3) a front baffle positioned at the front of the vessel chamber extending across the top. In these and other implementations, the dasher rotates in a clockwise direction, and the corner baffle and the side baffle are positioned on a left side of the vessel chamber when viewed from a front of the frozen drink maker.

One of ordinary skill will recognize that the systems, methods, and devices described herein may apply to other types of food products such as to the making and/or processing of, without limitation, ice cream, frozen yogurt, other creams, and the like. While the present disclosure describes examples of a drink maker processing various frozen and/or semi-frozen drink products, the systems, devices, and methods described herein are not limited to such drink products and are capable of processing and/or making other types of drink products such as cooled drink products and/or chilled drink products. The terms "mix," "mixed" or "mixing" as used herein are not limited to combining multiple ingredients together, but also include mixing a drink product or liquid having a single or no added ingredients. For example, a drink product may consist of only water that is mixed by a dasher during processing, i.e., portions of the water are churned and/or intermingled as the dasher rotates. This may, for example, advantageously enable a more uniform temperature of the water and/or liquid as a whole within the mixing vessel by intermingling portions of the water and/or liquid having different temperatures.

A reading of the following detailed description and a review of the associated drawings will make apparent the advantages of these and other structures. Both the foregoing general description and the following detailed description serve as an explanation only and do not restrict aspects of the disclosure as claimed.

BRIEF DESCRIPTION OF THE DRAWINGS

Reference to the detailed description, combined with the following figures, will make the disclosure more fully understood, wherein.

DETAILED DESCRIPTION

Figure 1:
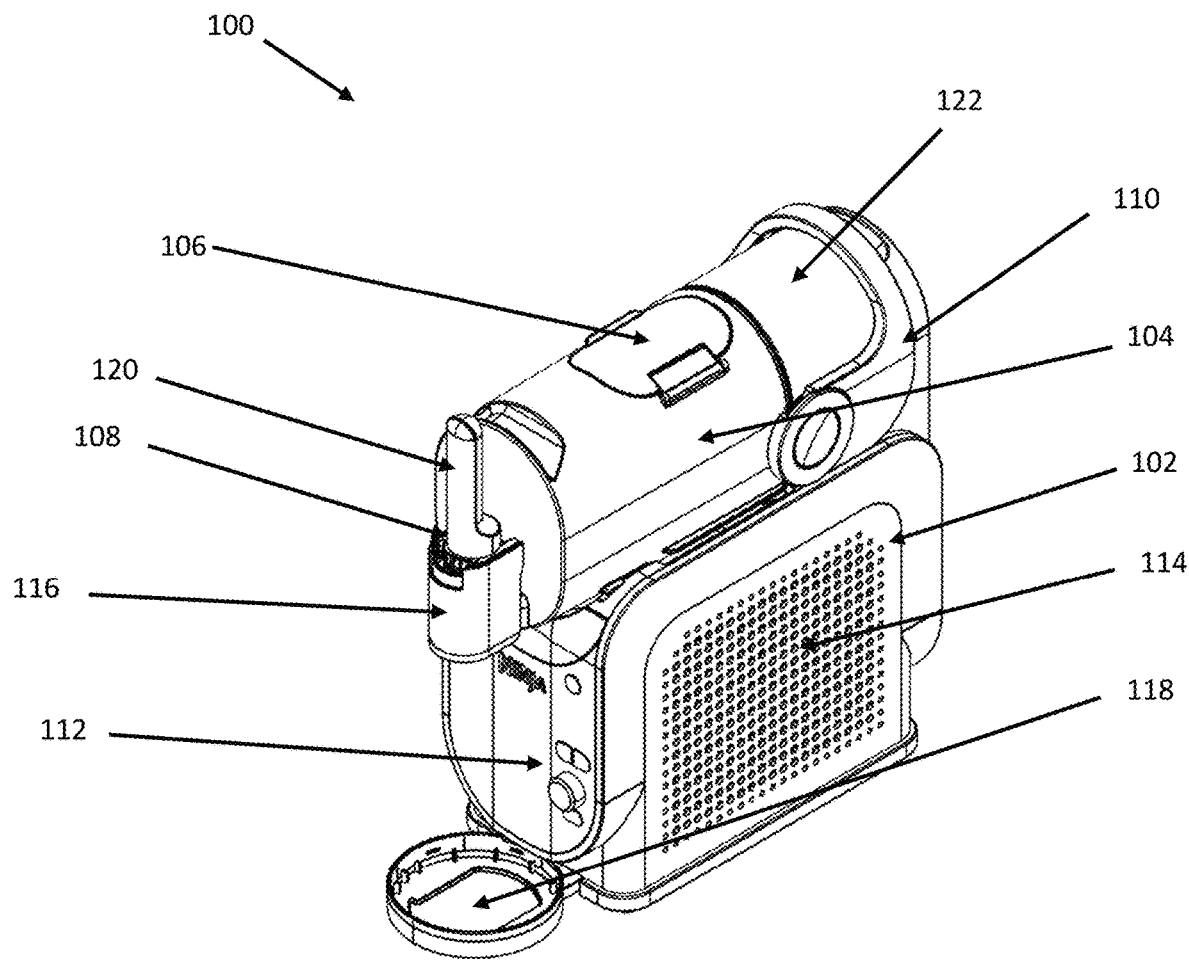
FIG. 1 shows a perspective view of a frozen drink maker according to an implementation of the disclosure.

In the following description, like components have the same reference numerals, regardless of different illustrated implementations. To illustrate implementations clearly and concisely, the drawings may not necessarily reflect appropriate scale and may have certain structures shown in somewhat schematic form. The disclosure may describe and/or illustrate structures in one implementation, and in the same way or in a similar way in one or more other implementations, and/or combined with or instead of the structures of the other implementations.

In the specification and claims, for the purposes of describing and defining the invention, the terms "about" and "substantially" represent the inherent degree of uncertainty attributed to any quantitative comparison, value, measurement, or other representation. The terms "about" and "substantially" moreover represent the degree by which a quantitative representation may vary from a stated reference without resulting in a change in the basic function of the subject matter at issue. Open-ended terms, such as "comprise," "include," and/or plural forms of each, include the listed parts and can include additional parts not listed, while terms such as "and/or" include one or more of the listed parts and combinations of the listed parts. Use of the terms "top," "bottom," "above," "below" and the like helps only in the clear description of the disclosure and does not limit the structure, positioning and/or operation of the disclosure in any manner.

The application, in various implementations, addresses deficiencies of existing frozen drink makers associated with controlling slush flow. Unfortunately, existing frozen drink makers must be very tall to provide sufficient headspace above the slush, so the slush does not contact the upper sidewalls of the vessel and the top of the chamber.

Accordingly, there is a need for features within the mixing chamber to effectively control the slush and keep it from migrating up the sidewalls and sticking to the top of the chamber. The need for controlling slush is especially important for household frozen drink makers (as compared to commercial models) because household frozen drink makers cannot rely on a tall chamber height to control slush flow.

The disclosed mixing vessels include at least one internal baffle (e.g., rib) positioned toward a front of the mixing chamber to optimize slush processing and flow within the vessel. The mixing vessel may include, one, two, three, or more internal baffles to control slush flow. For example, the mixing vessel may include a first baffle (i.e., a "side baffle") extending laterally along a sidewall of the vessel chamber, a second baffle (i.e., a "front baffle") positioned along a front surface of the vessel chamber, and/or a third baffle (i.e., a "corner baffle") positioned at a front top side of the vessel chamber, optionally extending between the side baffle and the corner baffle, if present. In implementations in which the corner baffle, side baffle, and front baffle are each present, the corner baffle may physically join the side baffle and the front baffle. The one or more internal baffles are arranged to keep slush off of the upper sidewalls and top of the mixing vessel chamber. Without wishing to be bound by theory, implementations in which the mixing vessel includes a side baffle, a front baffle, and a corner baffle connecting the side baffle and the front baffle, all three baffles may work in tandem to direct contents within the mixing vessel away from the top of the vessel. In contrast to commercial frozen drink makers with a significant amount of headspace in the mixing chamber, the disclosed mixing vessels may have a much shorter chamber, meaning a shorter distance between the center axis of the dasher and the top of the mixing vessel, to ensure the device can fit under a cabinet. The reduced chamber height of household frozen drink makers amplifies the need for precise slush control to keep slush from sticking to the upper sidewalls and top of the vessel, which can result in poor circulation, non-uniform dispensing, and product waste. Furthermore, the one or more baffles present in the vessel chamber may also deflect slush away from the chamber lid so that the lid does not get forced off, as in some commercial units.

FIG. 1 shows a perspective view of a frozen drink maker 100 according to an illustrative implementation of the disclosure. The frozen drink maker 100 includes a housing 102 and mixing vessel 104. The housing 102 may include user interface 112 for receiving user inputs to control frozen drink maker 100 and/or to output or display information. User interface 112 may include one or more buttons, dials, switches, touchscreens, indicators, LEDs, and the like. User interface 112 may display status information including for example, a temperature of a drink product within mixing vessel 104, an indicator of a recipe and/or program currently being implemented, a timer associated with the progress of a recipe and/or program in progress and/or currently being implemented. User interface 112 may provide indicators and/or warnings to users regarding, for example, when a recipe is complete or when a user is expected to perform an action associated with processing a drink product. User interface 112 may include a selectable menu of drink types (e.g., recipes) and/or programs for different types of drink products such as, without limitation, granita, smoothie, margarita, daiquiri, pina colada, slushi, cocktail, frappe, juice, diary, milk shake, cool drink, semi-frozen drink, frozen drink, and the like.

Housing 102 may include a panel (e.g., a removable panel) 114 along a side of the housing 102. Panel 114 may include a plurality of openings that facilitate air flow to aid in cooling components within housing 102. Housing 102 may include upper housing section 122 that is arranged to couple with a rear end of mixing vessel 104 when mixing vessel 104 is attached to housing 102. Mixing vessel 104 may include walls, or a portion thereof, that are transparent to enable a viewer to see a drink product within mixing vessel 104 during processing. Mixing vessel 104 may include pour—in opening 106 whereby mixing vessel 104 can receive ingredients for processing a drink product within mixing vessel 104. FIG. 1 shows pour-in opening 106 in a closed configuration with a cover sealing opening 106. The cover may be detachably removable or moveable to open or close opening 106. Pour-in opening 106 may include a grate to inhibit a user from reaching into mixing vessel 104 when pour-in opening 106 is open, i.e., the cover is not installed. Mixing vessel 104 may include a dispenser assembly 108 having a user handle 120, a spout (not shown), and a spout shroud and/or cover 116. Dispenser assembly 108 enables a user, by pulling down on handle 120, to open a spout, connected to a wall of mixing vessel 104, to dispense a processed (e.g., cooled) drink product from mixing vessel 104. The user can close the spout by pushing handle 120 back to its upright position (shown in FIG. 1) and, thereby, stop the dispensing of the processed drink product.

Frozen drink maker 100 may include a lever 110 that enables a locked coupling of mixing vessel 104 to housing 102 including upper housing section 122. FIG. 1 shows lever 110 in the locked and/or closed position whereby mixing vessel 104 is engaged and/or coupled to housing 102 and upper housing section 122. In the closed and/or engaged position, lever 110 ensures that there is a water-tight seal to prevent leakage of drink product from mixing vessel 104. Lever 110 may be placed in the closed, coupled, and/or engaged position by sliding mixing vessel 104 against upper housing section 122 and then rotating lever 110 in a clockwise direction until its handle rests on or about the top surface of upper housing section 122. Mixing vessel 104 can be disengaged and/or decoupled from housing 102 and upper housing section 122 by pulling and/or rotating lever 110 in a counter-clockwise direction (from the perspective of FIG. 1) toward the front of mixing vessel 104, which causes lever 110 to release mixing vessel 104. Once released and/or decoupled, mixing vessel 104 may slide in a forward direction (away from upper housing section 122) to be fully detached and/or removed from housing 102. Mixing vessel 104 may include a radial seal and/or face seal. The face seal may provide an improved seal based on compression provided by lever 110 pushing mixing vessel 104 laterally against a wall of upper housing section 122. Mixing vessel 104 may include a circular and/or cylindrical opening at its rear end that couples mixing vessel 104 to upper housing section 122. An interlock switch may be implemented at the upper housing section 122 that is activated when mixing vessel 104 is coupled to upper housing section 122 that prevents activation of drive motor 208 unless vessel 104 is coupled to upper housing section 122. This ensures that a user is not exposed to a moving dasher 204. Frozen drink maker 100 may also include drip tray 118 being positioned below dispenser assembly 108 and arranged to collect any drink product that is not properly dispensed from mixing vessel 104 to, for example, a user cup. Drip tray 118 may be attachably removable from its operational position shown in FIG. 1. For example, water tray 118 may mounted and/or stored on a side panel of housing 102 as illustrated in FIG. 3 as water tray 304.

Figure 2:
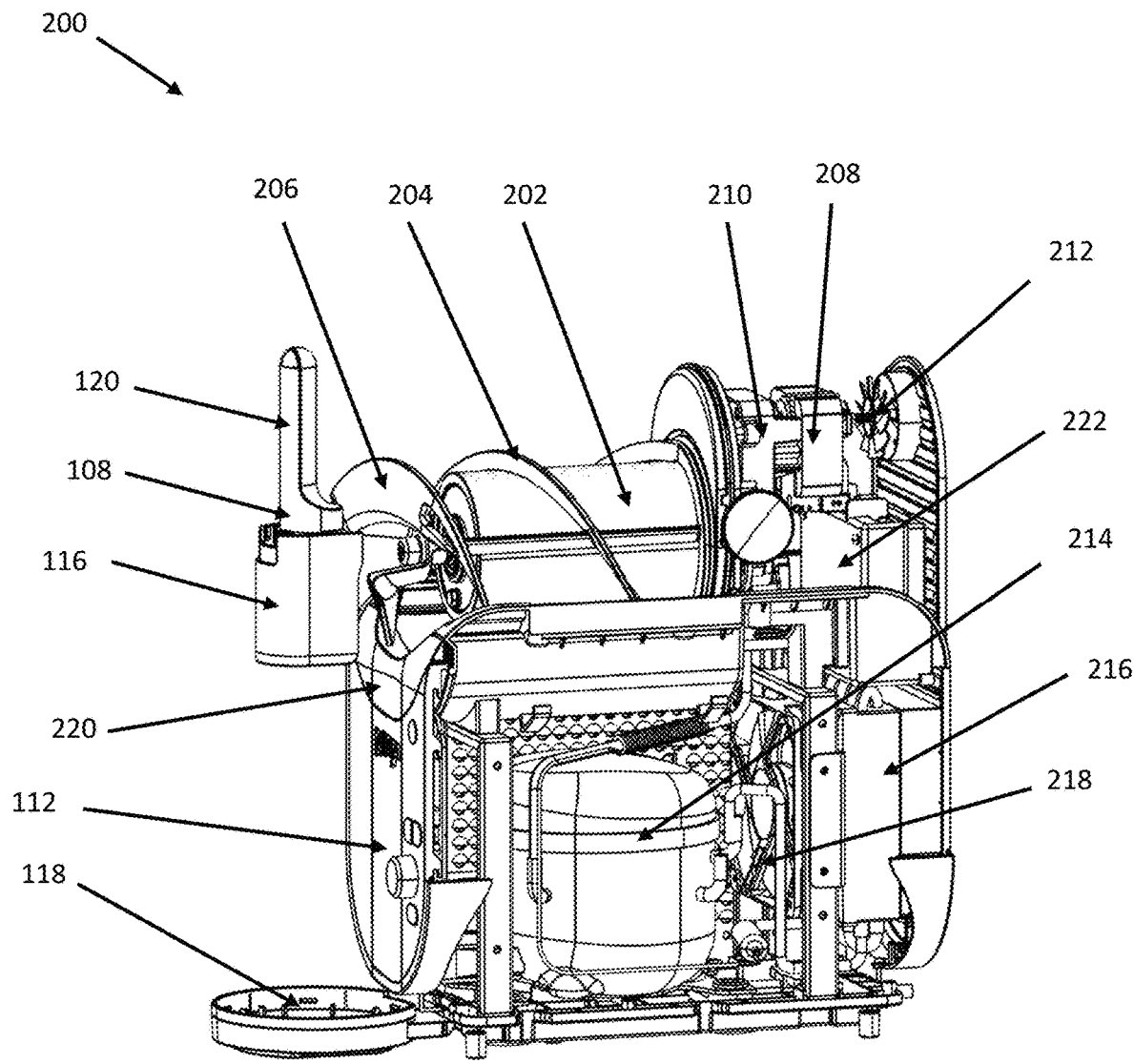
FIG. 2 shows a view of various internal components within the housing and mixing vessel of the frozen drink maker of FIG. 1 according to an implementation of the disclosure.

FIG. 2 shows a view 200 of various internal components within housing 102 and mixing vessel 104 of frozen drink maker 100 of FIG. 1. Frozen drink maker 100 includes a cylindrical evaporator 202 that is surrounded by an auger and/or dasher 204. Dasher 204 may include one or more mixing blades and/or protrusions that extend helically around evaporator and/or chiller 202. Dasher 204 may be driven to rotate by a central drive shaft (not shown) within mixing vessel 104. The drive shaft may be surrounded by evaporator 202. However, in various implementations, evaporator 202 does not rotate. The drive shaft may be coupled via a gear assembly 210 to a drive motor 208. In some implementations, drive motor 208 is an AC motor, but another type of motor may be used such as, without limitation, a DC motor. Drive motor 208 may include a motor fan 212 arranged to provide air cooling for motor 208. While FIG. 2 shows an implementation where drive motor 208 is not coaxially aligned with the drive shaft used to rotate dasher 204, in other implementations, motor 208 can be aligned coaxially with the drive shaft. During processing of a drink product, motor 208 may be continuously operated at a one or more speeds to drive continuous rotation of dasher 204 and, thereby, provide continuous mixing of the drink product within mixing vessel 104. In some implementations, the rotation of the dasher 204 causes the helically arranged blades to push the cooling drink product to the front of the mixing vessel 104. During the processing, portions of the drink product may freeze against the surface of the evaporator as a result of being cooled by the evaporator. In some implementations, the blades of the rotating dasher 204 scrape frozen portions of the drink product from the surface the evaporator while concurrently mixing and pushing the cooling drink product towards the front of the mixing vessel 104.

Frozen drink maker 100 may include a refrigeration circuit and/or system to provide cooling of a drink product and/or to control the temperature of a drink product within mixing vessel 104. The refrigeration circuit may include a compressor 214, an evaporator 202, a condenser 216, a condenser fan 218, a bypass valve, and conduit that carries refrigerant in a closed loop among the refrigeration circuit components to facilitate cooling and/or temperature control of a drink product in mixing vessel 104. Operations of the refrigeration circuit may be controlled by a controller, such as controller 402, as described further with respect to FIG. 4 later herein. Frozen drink maker 100 may also include a condensation collection tray 220 arranged to collect any liquid condensation caused by cooling from evaporator 202. FIG. 2 shows tray 220 in the inserted position. Tray 220 may be insertably removable from a slot within housing 102 to enable collection of condensed liquid when inserted into the slot and then efficient removal to empty tray 220, and then re-insertion into the slot for subsequent liquid collection.

Figure 3:
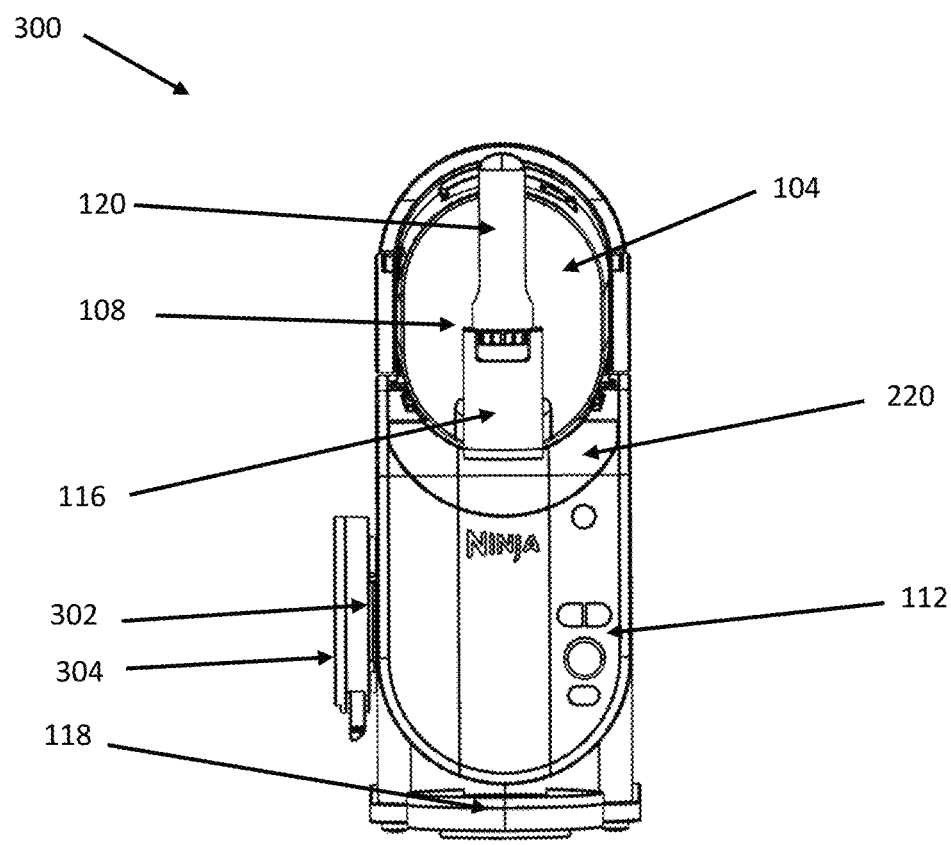
FIG. 3 shows a front view of the frozen drink maker of FIG. 1 according to some implementations of the disclosure.

FIG. 3 shows a front view 300 of frozen drink maker 100 of FIG. 1. Frozen drink maker 100 may include user interface 112 on a front surface of housing 102. In other implementations, user interface 112 may be located on a side, top, or back of housing 102. Frozen drink maker may include a mount 302 on a side of housing 102 where drip tray 118 can be mounted when not in use (shown as drip tray 304 in FIG. 3) such as during transport of frozen drink maker 100. Frozen drink maker 100 may include a power interface arranged to receive AC power from a power outlet (not shown). In some implementations, frozen drink maker 100 may include one or more batteries housed within housing 102 and arranged to provide power to various components of frozen drink maker 100. Frozen drink maker 100 may also include a printed circuit board assembly (PCBA) 222 within housing 102. As will be explained with respect to FIG. 4, PCBA 222 may include a control system 400 arranged to automatically control certain operations of frozen drink maker 100.

Figure 4:
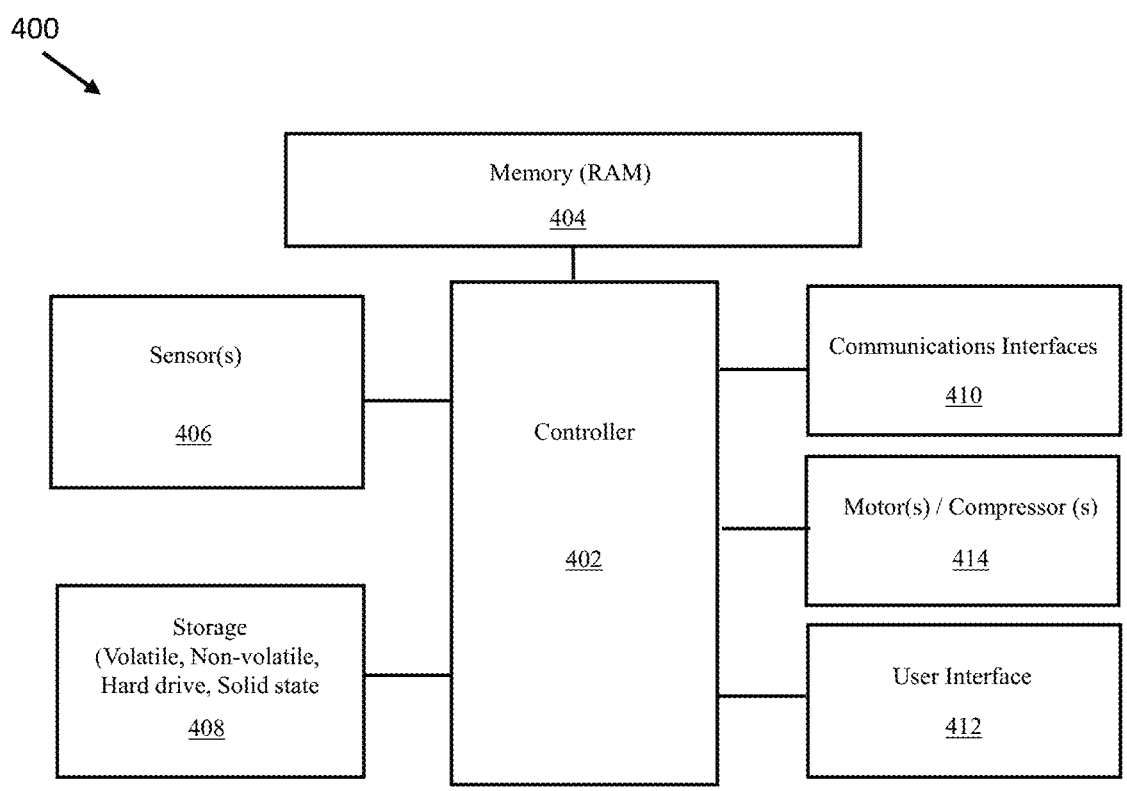
FIG. 4 is a block diagram of an example of a control system of the frozen drink maker of FIG. 1, according to some implementations of the disclosure.

FIG. 4 is a block diagram illustrating an example of a control system 400 of frozen drink maker 100 according to some implementations of the disclosure. Control system 400 may include a microcontroller, a processor, a system-on-a-chip (SoC), a client device, and/or a physical computing device and may include hardware and/or virtual processor(s). In some implementations, control system 400 and its elements as shown in FIG. 4 each relate to physical hardware, while in some implementations one, more, or all of the elements could be implemented using emulators or virtual machines. Regardless, electronic control system 400 may be implemented on physical hardware, such as in frozen drink maker 100.

As also shown in FIG. 4, control system 400 may include a user interface 212 and/or 112, having, for example, a keyboard, keypad, one or more buttons, dials, touchpad, or sensor readout (e.g., biometric scanner) and one or more output devices, such as displays, speakers for audio, LED indicators, and/or light indicators. Control system 400 may also include communications interfaces 410, such as a network communication unit that could include a wired communication component and/or a wireless communications component, which may be communicatively coupled to controller and/or processor 402. The network communication unit may utilize any of a variety of proprietary or standardized network protocols, such as Ethernet, TCP/IP, to name a few of many protocols, to effect communications between processor 402 and another device, network, or system. Network communication units may also comprise one or more transceivers that utilize the Ethernet, power line communication (PLC), Wi-Fi, cellular, and/or other communication methods. For example, control system 400 may send one or more communications associated with a status of frozen drink maker 100 to a mobile device of a user, e.g., send an alert to the mobile device when a recipe is complete and/or a drink product is ready for dispensing, or to indicate that the mixing vessel is low or out of a drink product.

Control system 400 may include a processing element, such as controller and/or processor 402, that contains one or more hardware processors, where each hardware processor may have a single or multiple processor cores. In one implementation, the processor 402 includes at least one shared cache that stores data (e.g., computing instructions) that are utilized by one or more other components of processor 402. For example, the shared cache may be a locally cached data stored in a memory for faster access by components of the processing elements that make up processor 402. Examples of processors include but are not limited to a central processing unit (CPU) and/or microprocessor. Controller and/or processor 402 may utilize a computer architecture base on, without limitation, the Intel® 8051 architecture, Motorola® 68HCX, Intel® 80X86, and the like. The processor 402 may include, without limitation, an 8-bit, 12-bit, 16-bit, 32-bit, or 64-bit architecture. Although not illustrated in FIG. 4, the processing elements that make up processor 402 may also include one or more other types of hardware processing components, such as graphics processing units (GPUs), application specific integrated circuits (ASICs), field-programmable gate arrays (FPGAs), and/or digital signal processors (DSPs).

FIG. 4 also illustrates that memory 404 may be operatively and communicatively coupled to controller 402. Memory 404 may be a non-transitory medium configured to store various types of data. For example, memory 404 may include one or more storage devices 408 that include a non-volatile storage device and/or volatile memory. Volatile memory, such as random-access memory (RAM), can be any suitable non-permanent storage device. The non-volatile storage devices 408 may include one or more disk drives, optical drives, solid-state drives (SSDs), tape drives, flash memory, read-only memory (ROM), and/or any other type of memory designed to maintain data for a duration time after a power loss or shut down operation. In certain configurations, the non-volatile storage devices 408 may be used to store overflow data if allocated RAM is not large enough to hold all working data. The non-volatile storage devices 408 may also be used to store programs that are loaded into the RAM when such programs are selected for execution. Data store and/or storage devices 408 may be arranged to store a plurality of drink product making and/or processing instruction programs associated with a plurality of drink product processing sequences, i.e., recipes. Such drink product making and/or processing instruction programs may include instruction for controller and/or processor 402 to: start or stop one or motors and/or compressors 414 (e.g., such as motor 208 and/or compressor 214), start or stop compressor 214 to regulate a temperature of a drink product being processed within mixing vessel 104, operate the one or more motors 414 (e.g., motor 208 and/or compressor 214) at certain periods during a particular drink product processing sequence, operate motor 208 at certain speeds during certain periods of time of a recipe, issue one or more cue instructions to user interface 412 and/or 112 that are output to a user to illicit a response, action, and/or input from the user.

Persons of ordinary skill in the art are aware that software programs may be developed, encoded, and compiled in a variety of computing languages for a variety of software platforms and/or operating systems and subsequently loaded and executed by processor 402. In one implementation, the compiling process of the software program may transform program code written in a programming language to another computer language such that the processor 402 is able to execute the programming code. For example, the compiling process of the software program may generate an executable program that provides encoded instructions (e.g., machine code instructions) for processor 402 to accomplish specific, non-generic, particular computing functions.

After the compiling process, the encoded instructions may be loaded as computer executable instructions or process steps to processor 402 from storage 408, from memory 404, and/or embedded within processor 402 (e.g., via a cache or on-board ROM). Processor 402 may be configured to execute the stored instructions or process steps in order to perform instructions or process steps to transform the electronic control system 400 into a non-generic, particular, specially programmed machine or apparatus. Stored data, e.g., data stored by a data store and/or storage device 408, may be accessed by processor 402 during the execution of computer executable instructions or process steps to instruct one or more components within control system 400 and/or other components or devices external to system 400. For example, the recipes may be arranged in a lookup table and/or database within data store 408 and be accessed by processor 402 when executing a particular recipe selected by a user via user interface 412 and/or 112.

User interface 412 and/or 112 can include a display, positional input device (such as a mouse, touchpad, touchscreen, or the like), keyboard, keypad, one or more buttons, one or more dials, a microphone, speaker, or other forms of user input and output devices. The user interface components may be communicatively coupled to processor 402. When the user interface output device is or includes a display, the display can be implemented in various ways, including by a liquid crystal display (LCD) or a cathode-ray tube (CRT) or light emitting diode (LED) display, such as an OLED display.

Sensors 406 may include one or more sensors that detect and/or monitor conditions of a drink product within mixing vessel 104, conditions associated with a component of the frozen drink maker 100, and/or conditions of a refrigerant within the refrigeration system. Conditions may include, without limitation, rotation, speed of rotation, and/or movement of a device or component (e.g., a motor), rate of such movement, frequency of such movement, direction of such movements, motor current, motor voltage, motor power, motor torque, temperature, pressure, fluid level in vessel 104, position of a device or component (e.g., whether pour-in opening 106 is open or closed), and/or the presence of a device or component (e.g., whether shroud 116 is installed or not). Types of sensors may include, for example, electrical metering chips, Hall sensors, pressure sensors, temperature sensors, optical sensors, current sensors, torque sensors, voltage sensors, cameras, other types of sensors, or any suitable combination of the foregoing. Frozen drink maker 100 may include one or more temperature sensors positioned in various locations within mixing vessel 104 such as, for example, on or about the lower front area within mixing vessel 104, on or about the upper front area within mixing vessel 104, on or about the upper rear area within vessel 104, within one or more coils of evaporator 202, and/or within housing 102.

Sensors 406 may also include one or more safety and/or interlock switches that prevent or enable operation of certain components, e.g., a motor, when certain conditions are met (e.g., enabling activation of motor 208 and/or 414 when a lid or cover for opening 106 is attached or closed and/or when a sufficient level of drink product is in vessel 104). Persons of ordinary skill in the art are aware that electronic control system 400 may include other components well known in the art, such as power sources and/or analog-to-digital converters, not explicitly shown in FIG. 4.

In some implementations, control system 400 and/or processor 402 includes an SoC having multiple hardware components, including but not limited to: a microcontroller, microprocessor or digital signal processor (DSP) core and/or multiprocessor SoCs (MPSoC) having more than one processor cores; memory blocks including a selection of read-only memory (ROM), random access memory (RAM), electronically erasable programmable read-only memory (EEPROM) and flash memory; timing sources including oscillators and phase-docked loops; peripherals including counter-timers, real-time timers and power-on reset generators; external interfaces, including industry standards such as universal serial bus (USB), Fire Wire, Ethernet, universal synchronous/asynchronous receiver/transmitter (USART), serial peripheral interface (SPI); analog interfaces including analog-to-digital converters (ADCs) and digital-to-analog converters (DACs); and voltage regulators and power management circuits.

A SOC includes both the hardware, described above, and software controlling the microcontroller, microprocessor and/or DSP cores, peripherals and interfaces. Most SoCs are developed from pre-qualified hardware blocks for the hardware elements (e.g., referred to as modules or components which represent an IP core or IP block), together with software drivers that control their operation. The above listing of hardware elements is not exhaustive. A SoC may include protocol stacks that drive industry-standard interfaces like a universal serial bus (USB).

Once the overall architecture of the SoC has been defined, individual hardware elements may be described in an abstract language called RTL which stands for register-transfer level. RTL is used to define the circuit behavior. Hardware elements are connected together in the same RTL language to create the full SoC design. In digital circuit design, RTL is a design abstraction which models a synchronous digital circuit in terms of the flow of digital signals (data) between hardware registers, and the logical operations performed on those signals. RTL abstraction is used in hardware description languages (HDLs) like Verilog and VHDL to create high-level representations of a circuit, from which lower-level representations and ultimately actual wiring can be derived. Design at the RTL level is typical practice in modern digital design. Verilog is standardized as Institute of Electrical and Electronic Engineers (IEEE) 1364 and is an HDL used to model electronic systems. Verilog is most commonly used in the design and verification of digital circuits at the RTL level of abstraction. Verilog may also be used in the verification of analog circuits and mixed-signal circuits, as well as in the design of genetic circuits. In some implementations, various components of control system 400 are implemented on a PCB such as PCB 222.

In operation in certain implementations, a user fills mixing vessel 104 via pour-in opening 106 with ingredients associated with a drink product. The user selects the type of drink product to be processed via user interface 112, e.g., the user selects the recipe for "margarita." In some implementations, the user selects the product type and/or recipe before filling the mixing vessel 104 and the user interface 112 provides one or more indicators or queues (visible and/or audible) that instruct the user to add ingredients to mixing vessel 104. Mixing vessel 104 may include one or more fill sensors that detect when a sufficient amount or level of ingredients and/or fluid is within mixing vessel 104. The one or more fill sensors may provide a signal to processor 402 that indicates when vessel 104 is sufficiently filled or not filled. Processor 402 may prevent operations of the frozen drink maker 100 (e.g., prevent activation of motor 208 and/or other components) if the fill sensor(s) 406 indicate that vessel 104 is not sufficiently filled. A lid sensor may be associated with opening 106 whereby the lid sensor sends an open and/or closed signal to processor 402 that indicates whether opening 106 is open or closed. Processor 402 may prevent operations of the frozen drink maker 100 if the lid sensor indicates that opening 106 is open and/or not closed. Depending on the sensed condition, user interface 112 may provide an indication regarding the condition, e.g., that vessel 104 is sufficiently filled or not sufficiently filled and/or that opening 106 is not closed, to enable a user to take appropriate action(s).

Once mixing vessel 104 is filled with ingredients, the user may provide an input, e.g., a button press, to start processing of the drink product based on the selected recipe. Processing may include activation of motor 208 to drive rotation of dasher 204 and/or blade 206 to effect mixing of the ingredients of the drink product. Processing may also include activation of the refrigeration system including activation of compressor 214 and condenser fan 218. The compressor 214 facilitates refrigerant flow through one or more coils of evaporator 202 and through condenser 216 to provide cooling and/or temperature control of the drink product within mixing vessel 104. Processor 402 may control operations of various components such as motor 208 and compressor 214. To regulate temperature at a particular setting associated with a recipe, processor 402 may activate/start and/or de-activate/stop compressor 214 to start and/or stop refrigerant flow through the coil(s) of evaporator 202 and, thereby, start or stop cooling of the drink product within mixing vessel 104.

By cooling a drink product to a particular temperature, slush and/or ice particles may be formed within the drink product. Typically, the amount of particles and/or texture of a drink product corresponds to a temperature of the drink product, i.e., the cooler the temperature—the larger the amount of particles (and/or the larger the size of particles) and/or the more slushi the drink product. User interface 112 may enable a user to fine tune and/or adjust a preset temperature associated with a recipe to enable a user to adjust the temperature and/or texture of a drink product to a more desirable temperature and/or texture.

Processor 402 may perform processing of the drink product for a set period of time in one or more phases and/or until a desired temperature and/or texture is determined. Processor 402 may receive one or more temperature signals from one or more temperature sensors 408 within mixing vessel 104 to determine the temperature of the drink product. Processor 402 may determine the temperature of the drink product by determining an average temperature among temperatures detected by multiple temperature sensors 408. Processor 402 may determine the temperature of the drink product based on the detected temperature from one sensor 408 within mixing vessel 104 and/or based on a temperature of the refrigerant detected by a refrigerant temperature sensor 408. Once a phase and/or sequence of a recipe is determined to be completed by processor 402, processor 402 may, via user interface 116, provide a visual and/or audio indication that the recipe is complete and ready for dispensing. In response, a user may place a cup or container below dispenser assembly 108 and pull handle 120 rotationally downward towards the user to open a spout located at the lower front wall of mixing vessel 104, resulting in dispensing of the drink product into the cup or container. Once filled, the user can close the spout by pushing handle 120 back rotationally upward away from the user to its upright position shown in FIG. 2.

Figure 5A:
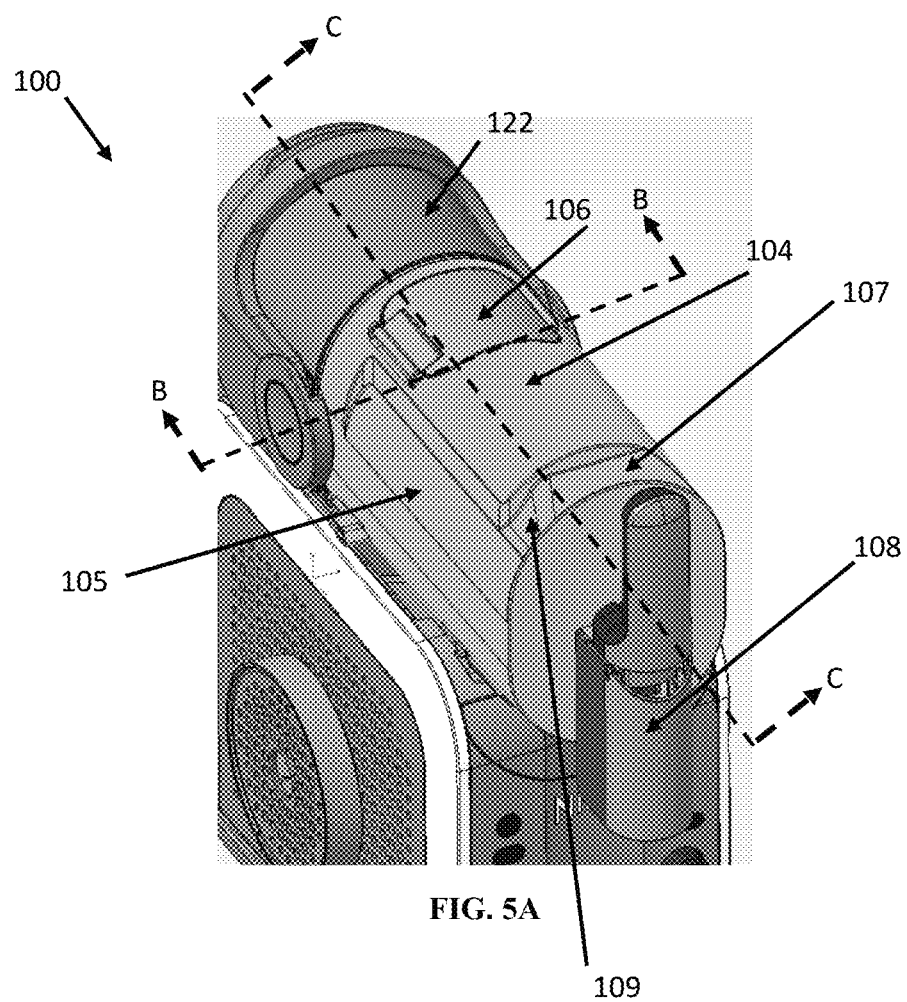
FIG. 5A shows an isometric view of the frozen drink maker with a mixing vessel having at least one internal baffle, in accordance with some implementations of the disclosure.
Figure 5B:
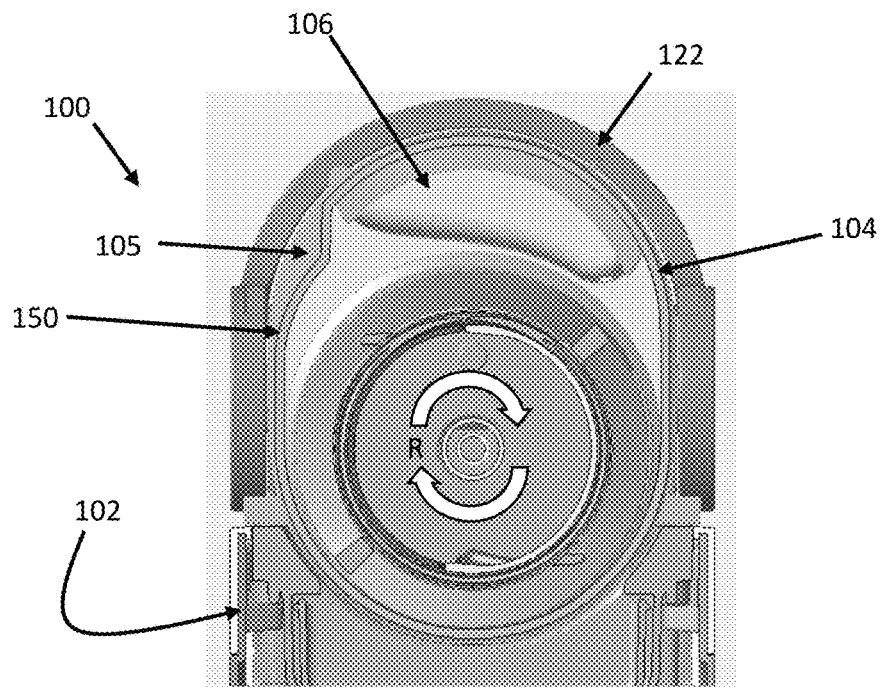
FIG. 5B shows a cross-sectional view of the frozen drink maker shown in FIG. 5A, taken along line B-B.
Figure 5C:
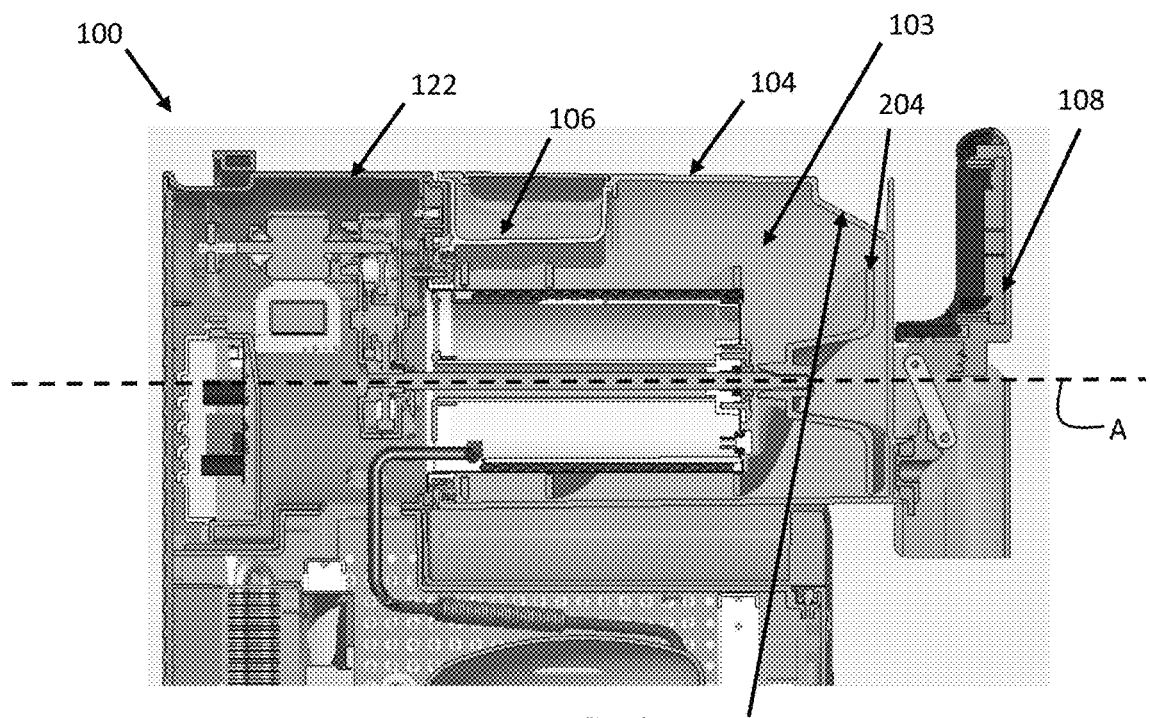
FIG. 5C shows a cross-sectional view of the frozen drink maker shown in FIG. 5A, taken along line C-C.

FIGS. 5A-5C show a sample frozen drink maker 100 with a mixing vessel 104 coupled to a housing 102 (specifically, the upper housing section 122) and a dispenser assembly 108, according to some implementations. The mixing vessel 104 has a curved sidewall defining a substantially cylindrical chamber within. In select implementations, the mixing vessel 104 is shaped as an ovoid or approximately as an ovoid (i.e., a cylinder with an ovular cross-section), or as an elliptic cylinder (i.e., a cylinder with an elliptic cross-section), or an approximate elliptic cylinder. When coupled to the housing 102, the front of the mixing vessel 104 contacts the dispenser assembly 108 and the rear of the mixing vessel 104 abuts the upper housing section 122. Within the mixing vessel 104, the front face of the chamber may have a substantially ovular shape or a substantially circular shape. The rear of the mixing vessel 104 chamber may include an opening configured to form a seal with the upper housing section 122. The opening at the rear of the mixing vessel 104 may have a substantially circular shape or a substantially ovular shape. The mixing vessel 104 is sized to accommodate a dasher 204 that rotates about a center axis (shown as center axis "A" in FIG. 5C). FIG. 5B shows a possible direction of dasher 204 rotation ("R"). The mixing vessel 104 may be shaped such that a distance from the center axis (A) of the dasher 204 to the top of the vessel chamber is less than 6 inches, less than 8 inches, less than 10 inches, less than 12 inches, less than 14 inches, or less than 16 inches.

Figure 6A:
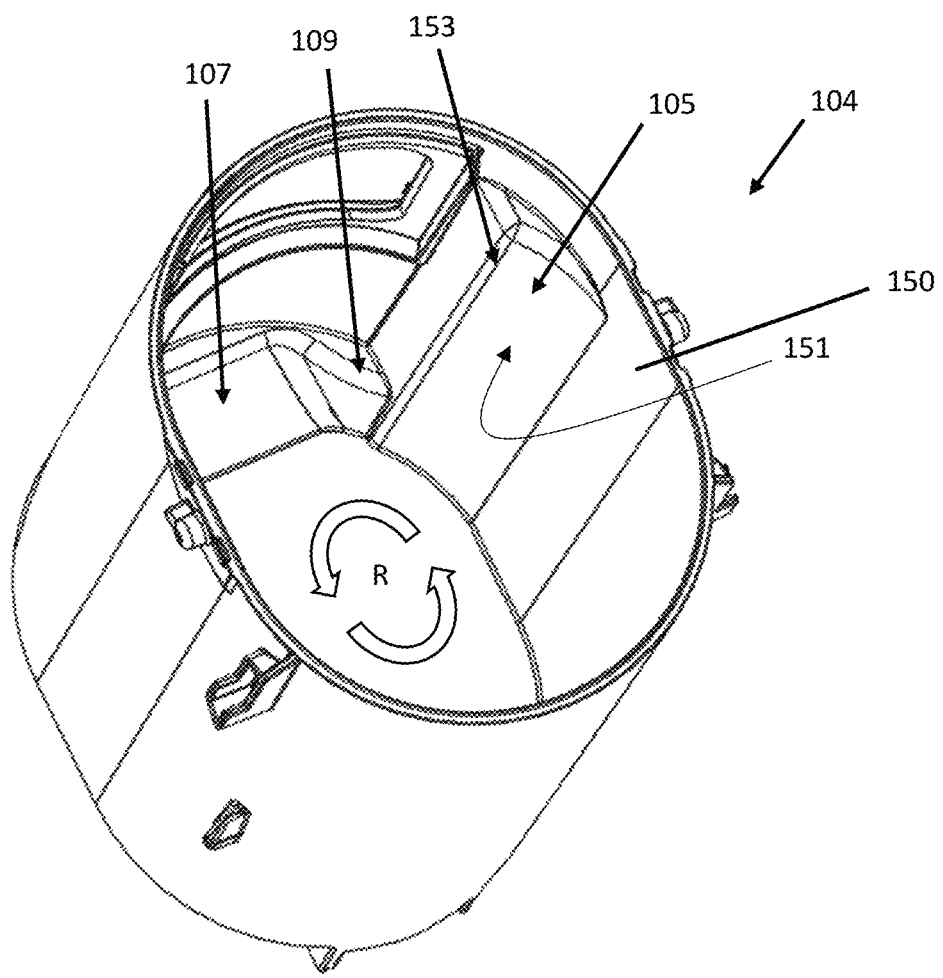
FIG. 6A shows a rear isometric view of a mixing vessel for a frozen drink maker with three internal baffles, in accordance with some implementations of the disclosure.
Figure 6B:
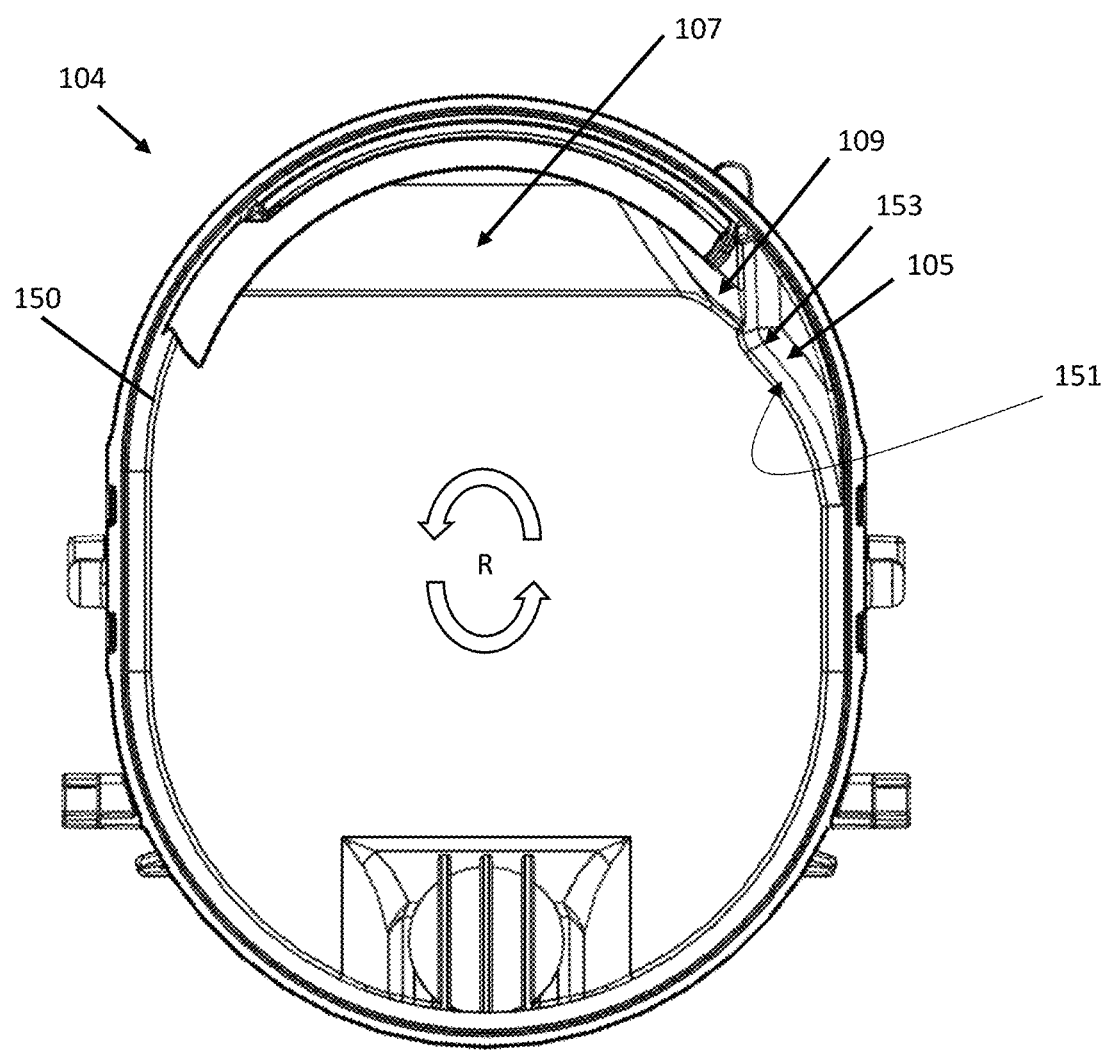
FIG. 6B shows a rear view of the mixing vessel shown in FIG. 6A.
Figure 6C:
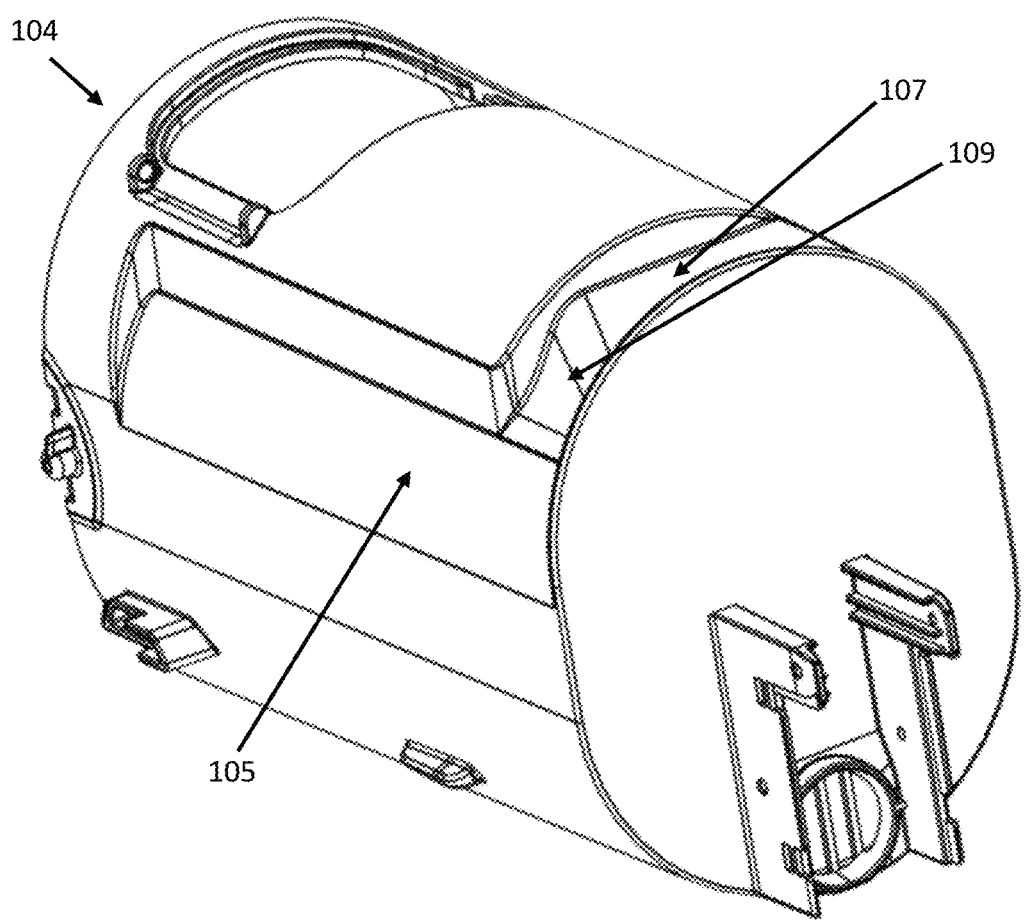
FIG. 6C shows a front isometric view of the mixing vessel shown in FIG. 6A.

FIGS. 6A-6C show an example of the mixing vessel 104 with at least one internal baffle configured to control slush flow within the mixing vessel 104. As shown in FIGS. 5A, 5B, and 6A-6B, the mixing vessel 104 includes a side baffle 105 extending laterally along a sidewall 150 of the vessel chamber. In some implementations, the side baffle 105 extends from the front of the vessel chamber (or approximate thereto) to the rear of the vessel chamber (or approximate thereto). In some implementations, the side baffle 105 extends along the chamber sidewall in a direction parallel to the center axis (A) of the dasher 204. In some implementations, the side baffle 105 is positioned on a left side (when viewed from the front) of the chamber sidewall (e.g., in embodiments in which the dasher rotates in a clockwise direction). FIGS. 6A and 6C illustrate a clockwise direction of dasher rotation (R) when viewed from the front. The side baffle 105 may be positioned slightly above the center axis (A) of the dasher 204, in some implementations.

The side baffle 105 may include a curved surface 151 that conforms to the pathway of the dasher 204, as shown in FIGS. 6A and 6B. For example, when viewed along the center axis (A) of the dasher, the side baffle 105 may protrude inwardly relative the ovular (e.g., elliptical) cross-section of the chamber sidewall 150, where, starting from a bottom end of the side baffle 105 at which the curved surface 151 of the side baffle 105 is vertical or substantially vertical, the curved surface 151 may slope gradually inward until reaching an inflection point 153. After reaching the inflection point 153, the curved surface 151 may slope more sharply vertically until the top end of the side baffle 105 is reached and, thereafter, the curved surface 151 of the side baffle 105 returns to a curvature in conformance with the ovular cross-section of the chamber sidewall 150. The radial direction of the curved surface 151 of the side baffle 105 from its bottom to the inflection point 153 is generally aligned with the radial movement of the dasher 204 and thus the contents of the vessel chamber 104. The cross-sectional geometry of the side baffle 105 described above directs the contents of the vessel away from a top of the vessel chamber (i.e., at a lower radial trajectory than if the side baffle 105 was not present, such as the right side of the vessel chamber as shown in FIG. 5B). If the side baffle 105 was not present, contents of the vessel chamber could flow unimpeded up the sidewall 150 to a top interior surface of the vessel chamber, which would leave these contents excluded from mixing and/or allow them to escape from the mixing vessel 104. The side baffle 105 thus reduces the amount of frozen material that could otherwise form on the top interior surface of the mixing vessel 104 as a result of its contents being rotated upwards.

As shown in FIGS. 5B, 5C, and 6A-C, the mixing vessel 104 may include a front baffle 107. If present, the front baffle 107 may be positioned at a front top portion of the vessel chamber 103 (illustrated in FIG. 5B). In some implementations, the front baffle 107 extends along the front face of the vessel chamber between the right sidewall and the left sidewall of the vessel chamber. The rotation of the dasher 204 pushes vessel contents towards the front of the vessel chamber, where, if left unchecked, contents could build up near the top front, perhaps even creating a frozen mass detrimental to the mixing process. Viewing from the cross-section of FIG. 5C, the front baffle 107 may form an angle relative the front face of the vessel chamber (e.g., 100°-150°, 100°-125°, or 105°) 120°, which redirects vessel contents that have been forced into the top front of the mixing vessel 104 towards the rear of the vessel chamber. In some implementations, the front baffle 107 may include a curved surface extending upwardly from the front face of the vessel chamber toward a top of the vessel chamber. In some such implementations, the angle the front baffle 107 forms relative to the front face of the vessel chamber varies from a lower angle (e.g., 5°) 20° at a section of front baffle 107 proximate to the front face of the vessel chamber to a higher angle (e.g., 75°) 90° at a section of front baffle proximate to the top of the vessel chamber.

The front baffle 107 is configured to urge contents away from the top surface of the vessel chamber to avoid buildup and overflow on the top of the mixing vessel 104. The front baffle 107 thus reduces the amount of frozen material that could otherwise form on the top front interior surface of the mixing vessel 104 as a result of the action of the dasher 204.

As shown in FIGS. 5C and 6A-6C, the mixing vessel 104 may include a corner baffle 109. The corner baffle 109 may be positioned at a front top side of the vessel chamber. The corner baffle 109 joins or connects the side baffle 105 and the front baffle 107. Thus, if the side baffle 105, front baffle 107, and corner baffle 109 are each present, the corner baffle 109 physically joins the side baffle 105 to the front baffle 107. As shown in FIGS. 6A-6B, the side baffle 105 and the front baffle 107 are orthogonal to each other and if these baffles terminated in a hard corner without a corner baffle 109, slush may not be properly directed. Connecting the side baffle 105 and the front baffle 107 with a corner baffle 109 allows slush to easily flow out of the corner between the side baffle 105 and the front baffle 107.

The corner baffle 109 has a curved surface 155 that extends from the side baffle 105 to the front baffle 107. The curved surface 155 may be convex, as shown in FIG. 6A. Along its length, the corner baffle 109 extends into the vessel chamber at a relatively constant distance. In other words, the depth of the corner baffle 109 may be relatively constant along the length of the corner baffle 109. The side of the vessel chamber in which the corner baffle 109 is positioned (e.g., the left side or the right side) can be selected based on the direction in which the dasher 204 rotates within the mixing vessel 104. In particular, the corner baffle 109 may be positioned such that the dasher 204 is directed toward the corner baffle 109 while moving upwardly within the vessel chamber. For example, in select implementations, the corner baffle 109 is positioned at the left top front of the vessel chamber when the dasher is arranged to rotate in a clockwise direction. This positioning may advantageously force slush downward toward the dasher 204 when it contacts the corner baffle 109 as the slush moves upwardly with the dasher 204, thereby reducing slush buildup on the sidewall and the top of the mixing vessel 104.

It should be understood that, in some implementations, the disclosed mixing vessel 104 includes one, two, three, or more internal baffles positioned within the vessel chamber. In other words, the mixing vessel 104 may include the side baffle 105, the front baffle 107, and/or the corner baffle 109. The side baffle 105, front baffle 107, and/or corner baffle 109 can reduce slush buildup on the sidewalls and top of the vessel chamber, which is important for commercial frozen drink makers as well as household frozen drink makers with significantly less headspace than commercial units.

It should be appreciated that the various implementations described herein are not limited to making frozen or semi-frozen drinks, but may be applied to produce a cold and/or cooled drink product that is cooler than a received drink product, but not frozen or semi-frozen. For example, in some implementations, the same or similar mechanisms and/or techniques may be used as part of a cold drink machine and/or cooled drink maker to produce, maintain and dispense cold drinks.

As discussed with respect to FIG. 4, actions associated with configuring or controlling a frozen drink maker such as frozen drink maker 100 and processes described herein can be performed by one or more programmable processors executing one or more computer programs to control or to perform all or some of the operations described herein. All or part of the frozen drink maker 100 systems and processes can be configured or controlled by special purpose logic circuitry, such as, an FPGA and/or an ASIC or embedded microprocessor(s) localized to the instrument hardware.

Non-transitory machine-readable storage media suitable for embodying computer program instructions and data include all forms of non-volatile storage area, including by way of example, semiconductor storage area devices, such as EPROM (erasable programmable read-only memory), EEPROM (electrically erasable programmable read-only memory), and flash storage area devices; magnetic disks, such as internal hard disks or removable disks; magneto-optical disks; and CD-ROM (compact disc read-only memory) and DVD-ROM (digital versatile disc read-only memory).

Elements of different implementations described may be combined to form other implementations not specifically set forth previously. Elements may be left out of the systems described previously without adversely affecting their operation or the operation of the system in general. Furthermore, various separate elements may be combined into one or more individual elements to perform the functions described in this specification.

What is claimed is:

1. A mixing vessel for a frozen drink maker, the mixing vessel comprising:
    a curved sidewall defining a vessel chamber therein, wherein the vessel chamber includes a front, a rear, a right side, a left side, and a top;
    a corner baffle positioned at the front and the top of the vessel chamber on either the right side or the left side, wherein the corner baffle is configured to direct slush flow within the vessel chamber; and
    a front baffle positioned at the front of the vessel chamber extending from the left side toward the right side across the top.

2. The mixing vessel of claim 1, wherein the mixing vessel is configured to accommodate a dasher that rotates within the vessel chamber about an axis and the corner baffle is positioned such that the dasher directs mixing vessel contents toward the corner baffle and upwardly within the vessel chamber.

3. The mixing vessel of claim 2, wherein from a perspective facing the front of the vessel chamber, the corner baffle is positioned on the left side of the vessel chamber and the dasher is arranged to rotate in a clockwise direction.

4. The mixing vessel of claim 1, wherein the corner baffle extends out from the front into the vessel chamber at a relatively constant distance.

5. The mixing vessel of claim 1, further comprising a side baffle extending laterally along the vessel chamber from the front toward the rear.

6. The mixing vessel of claim 5, wherein the side baffle is positioned on the left side or the right side of the vessel chamber.

7. The mixing vessel of claim 6, wherein the side baffle and the corner baffle are both positioned on either the left side or the right side of the vessel chamber.

8. The mixing vessel of claim 5, wherein the side baffle includes a curved surface that protrudes into an interior of the vessel chamber.

9. The mixing vessel of claim 1, further comprising a side baffle extending laterally along the vessel chamber from the front toward the rear, wherein the corner baffle has a curved surface that extends from the side baffle toward the front baffle.

10. The mixing vessel of claim 1, wherein the vessel chamber has an at least partially oval-shaped cross-section.

11. The mixing vessel of claim 1, wherein the mixing vessel further comprises a vertical protrusion at the front.

12. The mixing vessel of claim 1, wherein a portion of the front of the vessel chamber extends above at least one of: a front edge of the front baffle, a front edge of the corner baffle, or any combination thereof.

13. A mixing vessel for a frozen drink maker, the mixing vessel comprising:
    a curved sidewall defining a vessel chamber therein, wherein the vessel chamber includes a front, a rear, a right side, a left side, and a top;
    a corner baffle positioned at the front and the top of the vessel chamber on either the right side or the left side;
    a side baffle extending laterally along the vessel chamber from the front toward the rear; and
    a front baffle positioned at the front of the vessel chamber extending from the left side toward the right side across the top.

14. The mixing vessel of claim 13, wherein the side baffle and the corner baffle are both positioned on either the left side or the right side of the vessel chamber.

15. The mixing vessel of claim 14, wherein the mixing vessel is configured to accommodate a dasher that rotates within the vessel chamber about an axis, and the corner baffle and the side baffle are positioned such that the dasher is directed toward the corner baffle and the side baffle and upwardly within the vessel chamber.

16. The mixing vessel of claim 15, wherein the corner baffle and the side baffle are positioned on the left side of the vessel chamber and the dasher is arranged to rotate in a clockwise direction.

17. The mixing vessel of claim 13, wherein the corner baffle extends out from the front into the vessel chamber at a relatively constant distance.

18. The mixing vessel of claim 13, wherein the mixing vessel further comprises a vertical protrusion at the front.

19. The mixing vessel of claim 13, wherein a portion of the front of the vessel chamber extends above at least one of: a front edge of the front baffle, a front edge of the corner baffle, or any combination thereof.

20. A frozen drink maker comprising:
    a mixing vessel comprising a curved sidewall defining a vessel chamber having a front, a rear, a right side, a left side, and a top;
    a housing with an upper housing section abutting the rear of the mixing vessel;
    a dasher arranged to rotate within the mixing vessel about an axis; and
    a dispenser assembly at the front of the mixing vessel, wherein the mixing vessel comprises at least two internal baffles configured to control direct slush flow within the vessel chamber, the at least two internal baffles comprising a front baffle positioned at the front of the vessel chamber extending from the left side toward the right side across the top.

21. The frozen drink maker of claim 20, wherein the mixing vessel includes at least three internal baffles configured to direct slush flow within the vessel chamber.

22. The frozen drink maker of claim 21, wherein the at least three internal baffles include:
    a corner baffle positioned at a front and a top of the vessel chamber on either the right side or the left side;
    a side baffle extending laterally along the vessel chamber from the front toward the rear; and
    the front baffle.

23. The frozen drink maker of claim 22, wherein the dasher rotates in a clockwise direction, and the corner baffle and the side baffle are positioned on the left side of the vessel chamber when viewed from the front of the frozen drink maker.

24. The frozen drink maker of claim 20, wherein the mixing vessel further comprises a vertical protrusion at the front.

25. The frozen drink maker of claim 20, wherein a portion of the front of the vessel chamber extends above a front edge of the front baffle.

* * * * *